United States Patent
Yoshida et al.

(10) Patent No.: US 11,440,553 B2
(45) Date of Patent: Sep. 13, 2022

(54) VEHICULAR DEVICE AND COMPUTER-READABLE NON-TRANSITORY STORAGE MEDIUM STORING COMPUTER PROGRAM

(71) Applicant: DENSO CORPORATION, Kariya (JP)

(72) Inventors: Ichiro Yoshida, Kariya (JP); Kayoko Bando, Kariya (JP); Tetsushi Noro, Kariya (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 16/855,834

(22) Filed: Apr. 22, 2020

(65) Prior Publication Data

US 2020/0247421 A1 Aug. 6, 2020

Related U.S. Application Data

(63) Continuation of application No. PCT/JP2018/030795, filed on Aug. 21, 2018.

(30) Foreign Application Priority Data

Oct. 30, 2017 (JP) .............................. JP2017-209239

(51) Int. Cl.
*B60W 40/08* (2012.01)
*B60H 1/00* (2006.01)
(Continued)

(52) U.S. Cl.
CPC ......... *B60W 40/08* (2013.01); *B60H 1/00735* (2013.01); *B60W 10/30* (2013.01);
(Continued)

(58) Field of Classification Search
CPC ...... B60W 40/08; B60W 10/30; B60W 50/14; B60W 2540/225; B60W 2540/221; B60W 2040/0872; B60H 1/00735
See application file for complete search history.

(56) References Cited

U.S. PATENT DOCUMENTS

| 2017/0132924 A1 | 5/2017 | Tanaka et al. |
| 2018/0091085 A1 | 3/2018 | Tamagaki et al. |

(Continued)

FOREIGN PATENT DOCUMENTS

| JP | 2005190082 A | 7/2005 |
| JP | 2006244343 A | 9/2006 |

(Continued)

*Primary Examiner* — Peter D Nolan
*Assistant Examiner* — Wae L Louie
(74) *Attorney, Agent, or Firm* — Harness, Dickey & Pierce, P.L.C.

(57) ABSTRACT

A vehicular device includes: an eye opening degree determiner that determines a driver eye opening degree; a line-of-sight movement determiner that determines frequency of a driver line-of-sight movement; an operation determiner that determines a driver operation state for a driving operation instrument; a deviation determiner that determines a possibility that a driving state of a subject vehicle driver deviates from a safe driving state; a vehicle inside notification controller that performs a notification operation for a vehicle inside; and a vehicle outside notification controller that performs a notification operation for a vehicle outside.

8 Claims, 17 Drawing Sheets

(51) Int. Cl.
*B60W 10/30* (2006.01)
*B60W 50/14* (2020.01)
(52) U.S. Cl.
CPC ..... *B60W 50/14* (2013.01); *B60W 2040/0872* (2013.01); *B60W 2540/221* (2020.02); *B60W 2540/225* (2020.02)

(56) References Cited

U.S. PATENT DOCUMENTS

| | | | |
|---|---|---|---|
| 2018/0244288 A1* | 8/2018 | Glaser | B60W 50/14 |
| 2019/0204914 A1* | 7/2019 | Tsuda | G06V 40/193 |
| 2020/0257294 A1* | 8/2020 | Ishioka | G05D 1/0088 |
| 2020/0269849 A1* | 8/2020 | Kang | G06V 20/597 |
| 2020/0284883 A1* | 9/2020 | Ferreira | G01S 17/894 |
| 2020/0307644 A1* | 10/2020 | Hattori | B60W 60/0053 |
| 2021/0016805 A1* | 1/2021 | Oba | G06T 3/00 |
| 2021/0245769 A1* | 8/2021 | Yamaoka | B60W 40/09 |

FOREIGN PATENT DOCUMENTS

| | | | |
|---|---|---|---|
| JP | 2007094542 A | 4/2007 |
| JP | 2010224827 A | 10/2010 |
| JP | 2012155535 A | 8/2012 |
| JP | 2014026332 A | 2/2014 |
| JP | 2015200942 A | 11/2015 |
| JP | 2016053821 A | 4/2016 |
| JP | 2016091309 A | 5/2016 |
| JP | 2016197394 A | 11/2016 |
| JP | 2017091265 A | 5/2017 |
| JP | 2017117096 A | 6/2017 |

\* cited by examiner $\Delta d1 + \Delta d2 + \Delta d3 + \Delta d4 + \Delta d5 > A(\text{sum})$ $\Delta d1 + \Delta d2 + \Delta d3 + \Delta d4 + \Delta d5 > B(sum) > A(sum)$ VEHICULAR DEVICE AND
COMPUTER-READABLE NON-TRANSITORY
STORAGE MEDIUM STORING COMPUTER
PROGRAM

CROSS REFERENCE TO RELATED
APPLICATIONS

The present application is a continuation application of International Patent Application No. PCT/JP2018/030795 filed on Aug. 21, 2018, which designated the U.S. and claims the benefit of priority from Japanese Patent Application No. 2017-209239 filed on Oct. 30, 2017. The entire disclosures of all of the above applications are incorporated herein by reference.

TECHNICAL FIELD

The present disclosure relates to a vehicular device and a computer-readable non-transitory storage medium storing a computer program.

BACKGROUND

A vehicular device that determines a possibility that a driving state of a driver of a subject vehicle deviates from a safe driving state has been provided.

SUMMARY

A vehicular device may include: an eye opening degree determiner that may determine a driver eye opening degree; a line-of-sight movement determiner that may determine frequency of a driver line-of-sight movement; an operation determiner that may determine a driver operation state for a driving operation instrument; a deviation determiner that may determine a possibility that a driving state of a subject vehicle driver deviates from a safe driving state; a vehicle inside notification controller that may perform a notification operation for a vehicle inside; and a vehicle outside notification controller that may perform a notification operation for a vehicle outside.

BRIEF DESCRIPTION OF THE DRAWINGS

The features and advantages of the present disclosure will become more apparent from the following detailed description taken in conjunction with the accompanying drawings. In the drawings.

DETAILED DESCRIPTION

Figure 1:
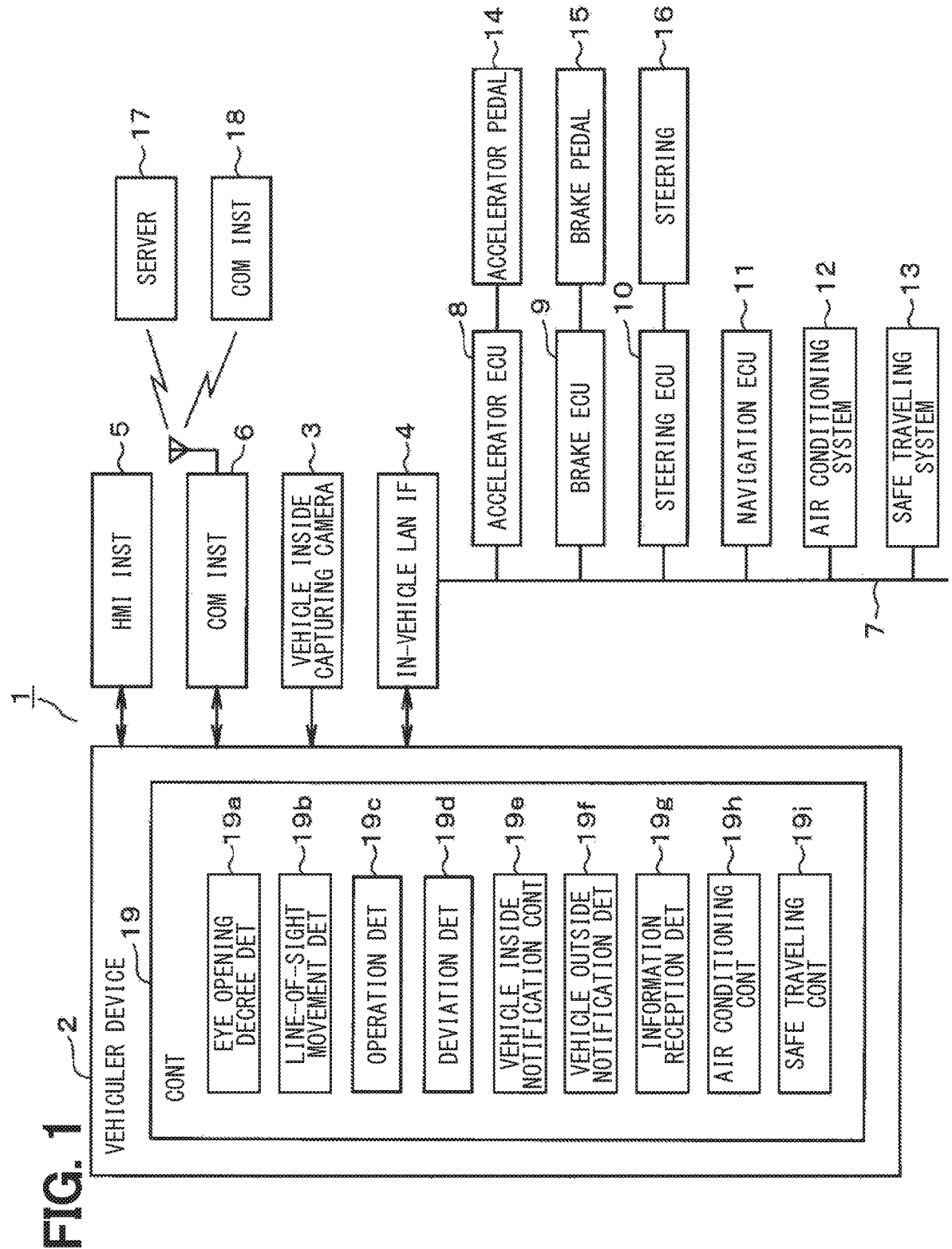
FIG. 1 is a functional block diagram showing one embodiment.

A vehicular device that determines a possibility that a driving state of a driver of a subject vehicle deviates from a safe driving state has been provided. When determining that the possibility is high, the vehicular device notifies the inside of the vehicle or the outside of the vehicle that the possibility is high. A comparative example shows a configuration of determining a possibility that the subject vehicle driver falls asleep and determining the possibility that the driving state of the subject vehicle driver deviates from the safe driving state.

In this type of the vehicular device, when a determination accuracy of the possibility that the driving state of the driver of the subject vehicle deviates from the safe driving state is not high, unnecessary notification is performed even though the driver of the subject vehicle maintains the safe driving state. Thereby, the driver may feel uncomfortable, or safety may not be ensured since the notification is not performed even though the driving state of the driver of the subject vehicle deviates from the safe driving state. The comparative example includes a configuration of determining the possibility that the driver falls asleep based on a driver eye opening degree or a frequency of line-of-sight movement. However, the determination accuracy may not be sufficient, and there may be improvement.

One example of the present disclosure provides a vehicular device and a computer-readable non-transitory storage medium storing a computer program capable of improving a determination accuracy of a possibility that a driving state of a driver of a subject vehicle deviates from a safe driving state.

According to one example embodiment, a vehicular device may include: an eye opening degree determiner that may determine a driver eye opening degree; a line-of-sight movement determiner that may determine frequency of a driver line-of-sight movement; an operation determiner that may determine a driver operation state for a driving operation instrument; a deviation determiner that may determine a possibility that a driving state of a subject vehicle driver deviates from a safe driving state based on a determination result of the driver eye opening degree, a determination result of the frequency of the driver line-of-sight movement, a determination result of the driver operation state for the driving operation instrument; a vehicle inside notification controller that may perform a notification operation for a vehicle inside; and a vehicle outside notification controller that may perform a notification operation for a vehicle outside. On a condition that a value indicating the possibility that the driving state of the subject vehicle driver deviates from the safe driving state exceeds a first determination value, the vehicle inside notification controller may perform the notification operation for notifying the vehicle inside that the value exceeds the first determination. On a condition that the value indicating the possibility that the driving state of the subject vehicle driver deviates from the safe driving state exceeds a second determination value higher than the first determination value, the vehicle outside notification controller may perform the notification operation for notifying the vehicle outside that the value exceeds the second determination value.

According to another example embodiment, a computer-readable non-transitory storage medium storing a computer program. The computer program may cause a controller of a vehicular device to determine a driver eye opening degree, determine frequency of a driver line-of-sight movement, determine a driver operation state for a driving operation instrument, determine a possibility that a driving state of a subject vehicle driver deviates from a safe driving state based on a determination result of the driver eye opening degree, a determination result of the frequency of the driver line-of-sight movement, and a determination result of the driver operation state for the driving operation instrument, perform, on a condition that a value indicating the possibility that the driving state of the subject vehicle driver deviates from the safe driving state exceeds a first determination value, a notification operation for notifying a vehicle inside that the value exceeds the first determination value, and perform, on a condition that the value indicating the possibility that the driving state of the subject vehicle driver deviates from the safe driving state exceeds a second determination value higher than the first determination value, a notification operation for notifying a vehicle outside that the value exceeds the second determination value.

As described above, the possibility that the driving state of the driver of the subject vehicle deviates from the safe driving state is determined based on an operation state of the driver for a driving operation instrument, in addition to the driver eye opening degree or the frequency of the driver line-of-sight movement. By adding the operation state of the driver for the driving operation instrument, it may be possible to multilaterally determine the possibility that the driving state of the subject vehicle driver deviates from the safe driving state, and improve the determination accuracy of the possibility that the driving state of the driver deviates from the safe driving state.

Hereinafter, an embodiment will be described with reference to the drawings. As shown in FIG. 1, a vehicle system 1 mounted on a subject vehicle includes a vehicular device 2, a vehicle inside capturing camera 3, an in-vehicle LAN interface 4, an HMI (human machine interface) instrument 5, and a communication instrument 6. In the drawings, the "INST" means an instrument, and the "COM" means communication. The vehicular device 2 multilaterally monitors a state of a driver. The vehicular device 2 may be installed on a vehicle at a stage of manufacturing the vehicle, or installed after the vehicle is shipped to a market.

The vehicle inside capturing camera 3 is placed inside the vehicle so as to capture a range including a face of the driver seated in a driver seat, and outputs an image signal including the captured image to the vehicular device 2. The vehicle inside capturing camera 3 may include, for example, a CCD (charge coupled device) image sensor, a CMOS (complementary metal oxide semiconductor) image sensor, or the like. The vehicle inside capturing camera 3 may be one or multiple.

The in-vehicle LAN interface 4 is connected to an accelerator ECU (electronic control unit) 8, a brake ECU 9, a steering ECU 10, a navigation ECU 11, an air conditioning system 12, and a safe traveling system 13 via an in-vehicle LAN 7.

The accelerator ECU 8 detects an operation amount of an accelerator pedal 14, and outputs a detection signal indicating the detected operation amount to the vehicular device 2. The brake ECU 9 detects an operation amount of a brake pedal 15, and outputs a detection signal indicating the detected operation amount to the vehicular device 2. The steering ECU 10 detects an operation amount of a steering 16, and outputs a detection signal indicating the detected operation amount to the vehicular device 2.

The navigation ECU 11 outputs a navigation signal including navigation information to the vehicular device 2. The navigation information output from the navigation ECU 11 to the vehicular device 2 includes vehicle speed information indicating vehicle speed of the subject vehicle, acceleration information indicating acceleration of the subject vehicle, position information indicating a current position of the subject vehicle, the current position being identified by a GNSS (global navigation satellite system), destination information indicating a destination set by the driver, route information indicating a route from the current position of the subject vehicle to the destination, road information regarding a road, intersection information regarding an intersection, or the like.

The air conditioning system 12 receives a control signal from the vehicular device 2, and controls air conditioning in accordance with the received control signal. The air conditioning system 12 controls, for example, temperature, air volume, air direction, or the like, and controls the air conditioning. The air conditioning system 12 stimulates the driver by, for example, performing control for increasing the volume of air dedicated to the driver, control for directing the air direction to the driver, or the like.

The safe traveling system 13 includes a vehicle outside capturing camera capturing the surroundings of the subject vehicle, a millimeter wave radar detecting obstacles around the subject vehicle, a LIDAR (light detection and ranging), a sonar, or the like. The safe traveling system 13 receives the control signal from the vehicular device 2, and performs safe traveling control in accordance with the received control signal. The safe traveling system 13 controls safe traveling by performing, for example, control for maintaining a distance between the subject vehicle and the preceding vehicle at a certain distance or more, control for maintaining a distance between the subject vehicle and a road shoulder or a median strip at a certain distance or more, control for example stopping the subject vehicle at a safe evacuation place, or the like. The safe traveling system 13 outputs the image signal including the image captured by the vehicle outside capturing camera or the detection signal detected by the millimeter wave radar, the LIDAR, the sonar, or the like to the vehicular device 2.

The HMI instrument 5 includes, for example, a head up display, a display unit placed on a center console, a speaker, or the like. The HMI performs notification operation when receiving a notification instruction signal from the vehicular device 2. That is, the head up display or the display unit displays display information in accordance with the notification instruction signal input from the vehicular device 2, and performs visual notification operation for the inside of the vehicle. The speaker outputs audio output information in accordance with the notification instruction signal input from the vehicular device 2, and performs auditory notification operation for the inside of the vehicle.

The communication instrument 6 includes, for example, a communication unit installed on the subject vehicle, a portable information terminal having a communication function and carried by the driver in the vehicle, or the like. The communication instrument 6 performs wireless communication in accordance with a predetermined wireless communication standard with a server 17 outside the vehicle or a communication instrument 18 installed on the other vehicle, and performs notification operation for the outside of the vehicle. The predetermined wireless communication standard includes, for example, WiFi (wireless fidelity, registered trademark), LTE (long term evolution, registered trademark), V2X (vehicle to everything), DSRC (dedicated short range communication, registered trademark), LPWA (low power wide area), or the like. When receiving a transmission instruction signal from the vehicular device 2, the communication instrument 6 transmits a transmission signal to the server 17 or the communication instrument 18 of the other vehicle in accordance with the transmission instruction signal. When receiving, as a reception signal, the transmission signal transmitted from the server 17 or the communication instrument 18 of the other vehicle, the communication instrument 6 outputs a reception detection signal to the vehicular device 2.

The present embodiment exemplifies the configuration in which the HMI instrument 5 and the communication instrument 6 are separately placed from the vehicular device 2. However, the vehicular device 2 may have a function of the HMI instrument 5 and a function of the communication instrument 6. The present embodiment exemplifies the configuration in which the air conditioning system 12 and the safe traveling system 13 are connected to the vehicular device 2 via the in-vehicle LAN 7. However, the air conditioning system 12 and the safe traveling system 13 may be connected to the vehicular device 2 without the in-vehicle LAN 7.

The vehicular device 2 includes a controller 19 that is provided by a microcomputer having a CPU (central process unit), a ROM (read only memory), a RAM (random access memory), and an I-O (input-output). The controller 19 executes a computer program stored in a non-transitory tangible storage medium to execute a process corresponding to the computer program, and controls the overall operation of the vehicular device 2.

The controller 19 includes an eye opening degree determiner 19a, a line-of-sight movement determiner 19b, an operation determiner 19c, a deviation determiner 19d, a vehicle inside notification controller 19e, a vehicle outside notification controller 19f, an information reception determiner 19g, an air conditioning controller 19h, and a safe traveling controller 19i. In the drawings, the "CONT" means a controller, and the "DET" means a determiner.

The eye opening degree determiner 19a analyzes the image of the image signal output from the vehicle inside capturing camera 3 to the vehicular device 2, and determines the eye opening degree of the driver based on, for example, a shape of an upper eyelid or a distance between the upper eyelid and a lower eyelid. The eye opening degree determiner 19a learns the shape of the upper eyelid or the distance between the upper and lower eyelids in a case where the driver drives in a normal state. The eye opening degree determiner 19a stores, as the normal state value, a numerical value obtained by numerically converting the shape or the distance. The eye opening degree determiner 19a numerically converts the shape of the upper eyelid or the distance between the upper and lower eyelids obtained by analyzing a real-time image, and determines the eye opening degree of the driver by comparing the measurement value obtained by the numerical conversion with the normal state value. The case where the driver drives in the normal state corresponds to, for example, a state where rapid acceleration, rapid deceleration, or rapid turn does not occur while the driver drives.

The line-of-sight movement determiner 19b analyzes the image of the image signal output from the vehicle inside capturing camera 3 to the vehicular device 2, and determines the frequency of line-of-sight movement of the driver based on eyeball movement. The line-of-sight movement determiner 19b learns the eyeball movement when the driver drives in the normal state, and stores, as the normal state value, a numerical value obtained by the numerical conversion. The line-of-sight movement determiner 19b numerically coverts the eyeball movement obtained by analyzing the real-time image, and determines the frequency of the line-of-sight movement of the driver by comparing a measurement value obtained by the numerical conversion with the normal state value.

The operation determiner 19c determines the driver operation state for the accelerator pedal 14, the brake pedal 15, and the steering 16 as the driving operation instrument. The operation determiner 19c determines the operation state for the driving operation instrument while the driver drives in the normal state, and stores, as the normal state value, a numerical value obtained by the numerical conversion. The operation determiner 19c numerically converts the operation state in the real time, and determines the driver operation state for the driving operation instrument by comparing a measurement value obtained by the numerical conversion with the normal state value.

In a case of the accelerator operation, for example, the operation determiner 19c determines a reaction time or an operation amount when the driver performs the accelerator operation, based on the navigation signal input from the navigation ECU 11, the image signal or the detection signal input from the safe traveling system 13, the detection signal input from the accelerator ECU 8, or the like. Thereby, the operation determiner 19c determines suitability (propriety) of the accelerator operation. The operation determiner 19c measures a reaction time or an operation amount in a situation where the acceleration of the subject vehicle is necessary such as, for example, a situation where the subject vehicle exits from the intersection or a situation where an inter vehicle distance between the subject vehicle and the preceding vehicle is equal to or higher than a predetermined distance. The operation determiner 19c compares the measurement value obtained by the measurement with the normal state value. When the reaction time or the operation amount is appropriate at the time, the operation determiner 19c determines the accelerator operation is appropriate. When the reaction time is late or the operation amount is small, that is, when the reaction time or the operation amount is inappropriate, the operation determiner 19c determines that the accelerator operation is inappropriate. The operation determiner 19c determines that the accelerator operation is inappropriate when the accelerator operation is performed in a situation where the acceleration of the subject vehicle is unnecessary such as a situation where the subject vehicle enters the intersection, a situation where the inter vehicle distance between the subject vehicle and the preceding vehicle is equal to or lower than the predetermined distance, or a situation where an obstacle such as a pedestrian or a bicycle in a traveling direction is detected, for example.

In a case of the brake operation, the operation determiner 19c determines a reaction time or an operation amount when the driver performs the brake operation, based on the navigation signal input from the navigation ECU 11, the image signal or the detection signal input from the safe traveling system 13, the detection signal input from the brake ECU 9, for example. Thereby, the operation determiner 19c determines propriety of the brake operation. The operation determiner 19c measures a reaction time or an operation amount in a situation where the deceleration of the subject vehicle is necessary such as the situation where the subject vehicle enters the intersection, the situation where the inter vehicle distance between the subject vehicle and the preceding vehicle is equal to or lower than the predetermined distance, or the situation where the obstacle such as the pedestrian or the bicycle is detected in the traveling direction, for example. The operation determiner 19c compares a measurement value obtained by the measurement with the normal state value. When the reaction time or the operation amount is appropriate at the time, the operation determiner 19c determines the brake operation is appropriate. When the reaction time is late or the operation amount is small, that is, when the reaction time or the operation amount is inappropriate, the operation determiner 19c determines that the brake operation is inappropriate. The operation determiner 19c determines that the brake operation is inappropriate when the brake operation is performed even in the situation where the deceleration of the subject vehicle is unnecessary such as the situation where the subject vehicle exits from the intersection or the situation where the inter vehicle distance between the subject vehicle and the preceding vehicle is equal to or higher than the predetermined distance, for example.

In a case of the steering operation, the operation determiner 19c determines a reaction time or an operation amount when the driver performs the steering operation, based on the navigation signal input from the navigation ECU 11, the image signal or the detection signal input from the safe traveling system 13, the detection signal input from the steering ECU 10, for example. Thereby, the operation determiner 19c determines propriety of the steering operation. The operation determiner 19c measures a reaction time or an operation amount in a situation where, for example, turn of the subject vehicle is necessary such as a situation where the subject vehicle turns right or left or a situation where there is a bend in the traveling direction of the subject vehicle. The operation determiner 19c compares a measurement value obtained by the measurement with the normal state value. When the reaction time or the operation amount is appropriate at the time, the operation determiner 19c determines the steering operation is appropriate. When the reaction time is late or the operation amount is small, that is, when the reaction time or the operation amount is inappropriate, the operation determiner 19c determines that the steering operation is inappropriate. The operation determiner 19c determines that the steering operation is inappropriate even when the steering operation is performed in a situation where the turn of the subject vehicle is unnecessary such as a situation where there is a straight road in the traveling direction of the subject vehicle, for example.

In the above description, the cases of the accelerator operation, the brake operation, and the steering operation have been exemplified. However, a case of the driver operation other than the operations described above may be determined. For example, in a case where the subject vehicle is a manual transmission type vehicle, propriety of a gear operation may be determined based on a reaction time or a gear position in a situation where the gear operation is necessary. In a case where the subject vehicle is a vehicle on which a rainfall sensor is installed, propriety of a wiper activation operation may be determined based on a wiper activation state in a situation where a wiper activation is necessary. In a case where the subject vehicle is a vehicle on which an illuminance sensor is installed, propriety of an operation for turning on a lighting device or an operation for turning off the lighting device may be determined based on a state where the lighting device is turned on or a state where the lighting device is turned off in a situation where it is necessary or unnecessary to turn on or off the lighting device. That is, the operation determiner 19c determines various operation states assumed to be performed by the driver during the driving, and comprehensively determines the operation state of the driver.

Figure 2:
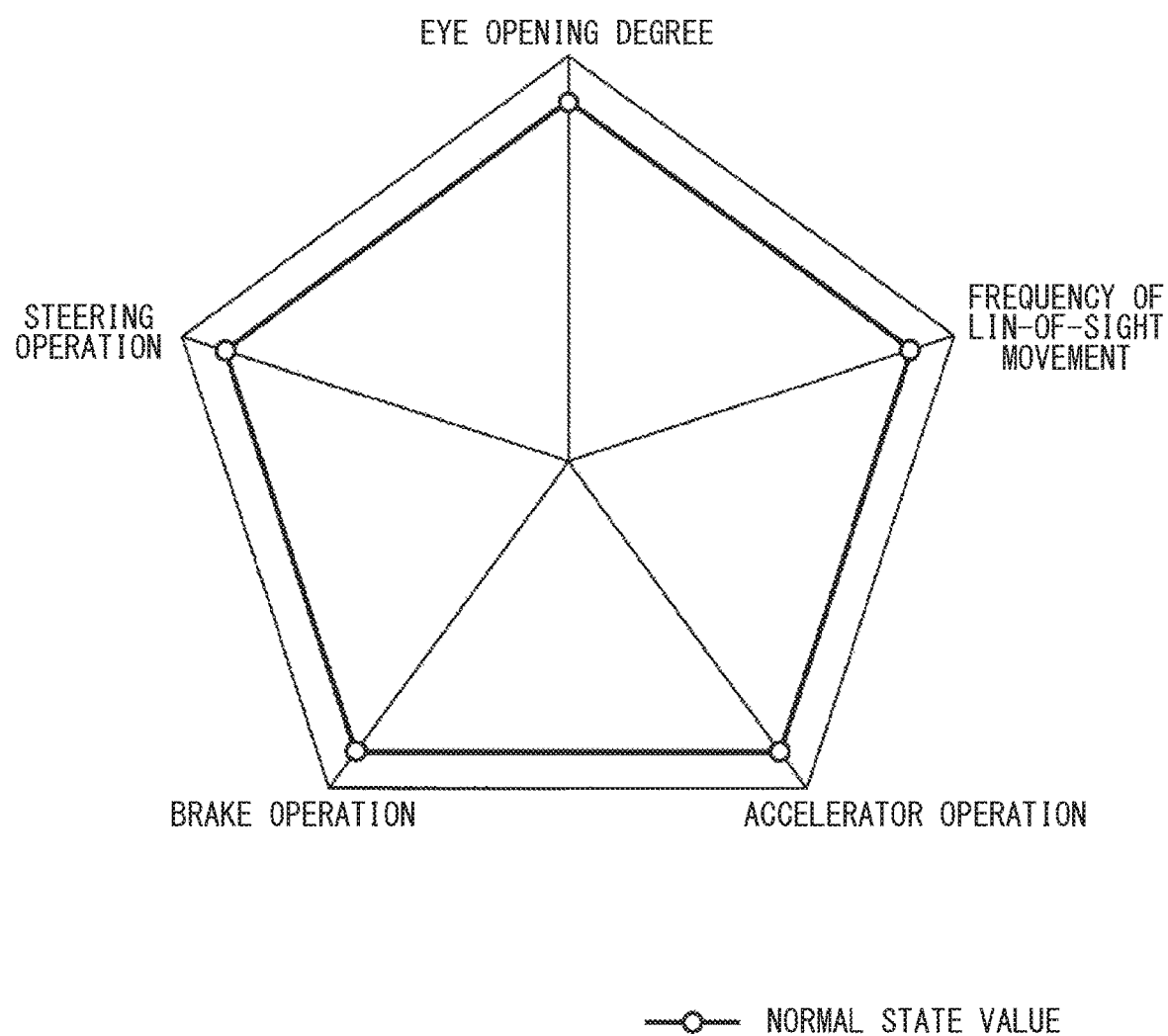
FIG. 2 is a diagram showing normal state values of determination items.

The deviation determiner 19d determines a possibility that a driving state of the driver of the subject vehicle deviates from the safe driving state based on the determination result of the driver eye opening degree by the eye opening degree determiner 19a, the determination result of the frequency of the driver line-of-sight movement by the line-of-sight movement determiner 19b, and the determination result of the driver operation state for the accelerator pedal 14, the brake pedal 15, or the steering 16 by the operation determiner 19c. Specifically, as shown in FIG. 2, the deviation determiner 19d calculates a difference between the measurement value and the normal state value for each of the five determination items of the eye opening degree, the frequency of the line-of-sight movement, the accelerator operation, the brake operation, and the steering operation. The deviation determiner 19d calculates the sum of calculated differences for the respective determination items. The deviation determiner 19d determines the possibility that the driving state of the driver of the subject vehicle deviates from the safe driving state in accordance with the sum obtained by the calculation.

The information reception determiner 19g performs determination of the safe driving deviation information. Specifically, the communication instrument 6 receives, as a reception signal, a transmission signal transmitted from the server 17 or the communication instrument 18 of the other vehicle, and thereby the reception detection signal is input from the communication instrument 6 to the vehicular device 2. Thereafter, the information reception determiner 19g determines whether the reception signal includes the safe driving deviation information, and determines whether to receive the safe driving deviation information from the server 17 or the communication instrument 18 of the other vehicle.

Figure 3:
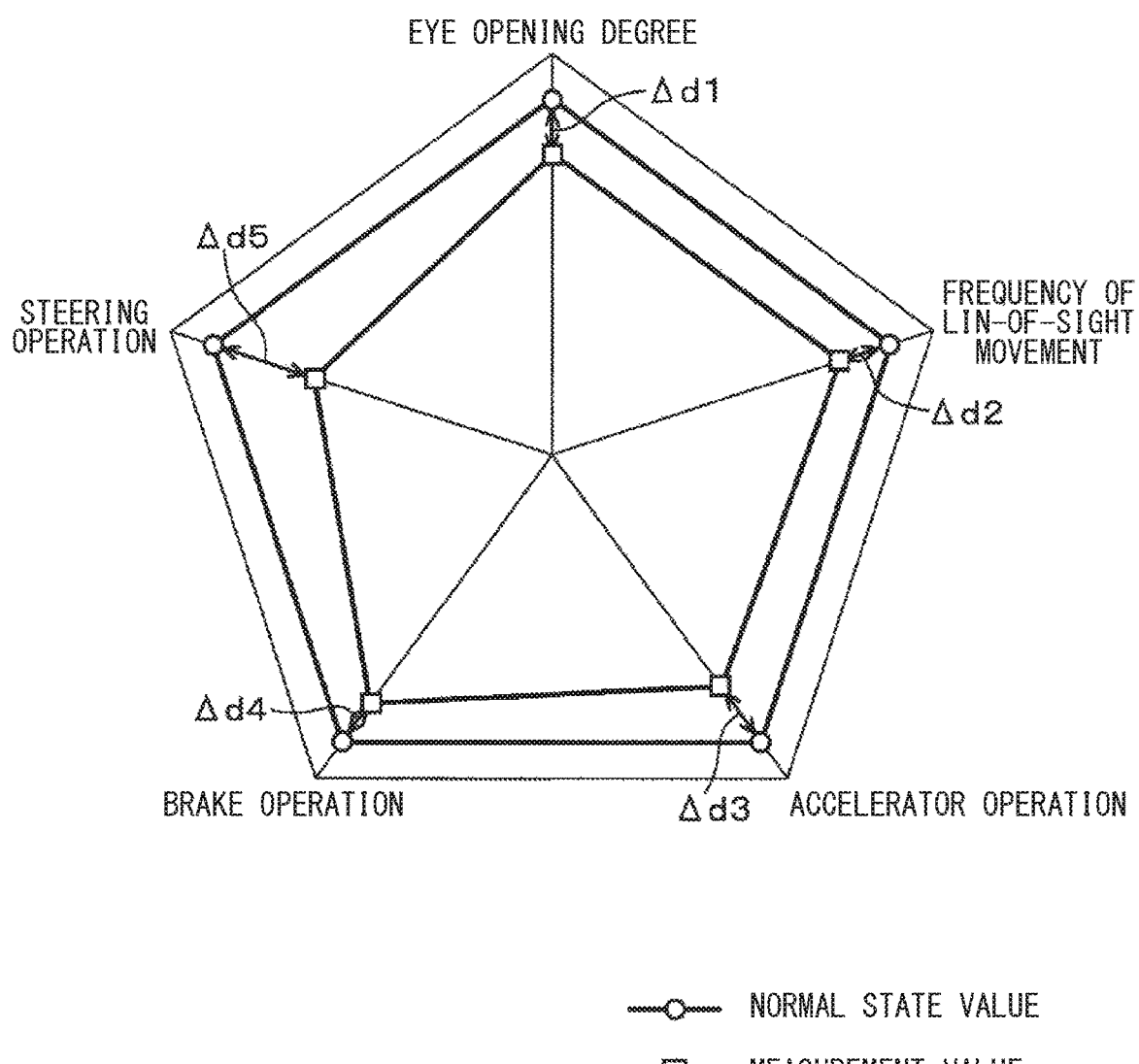
FIG. 3 is a diagram (part 1) showing the normal state values and measurement values of the determination items.
Figure 4:
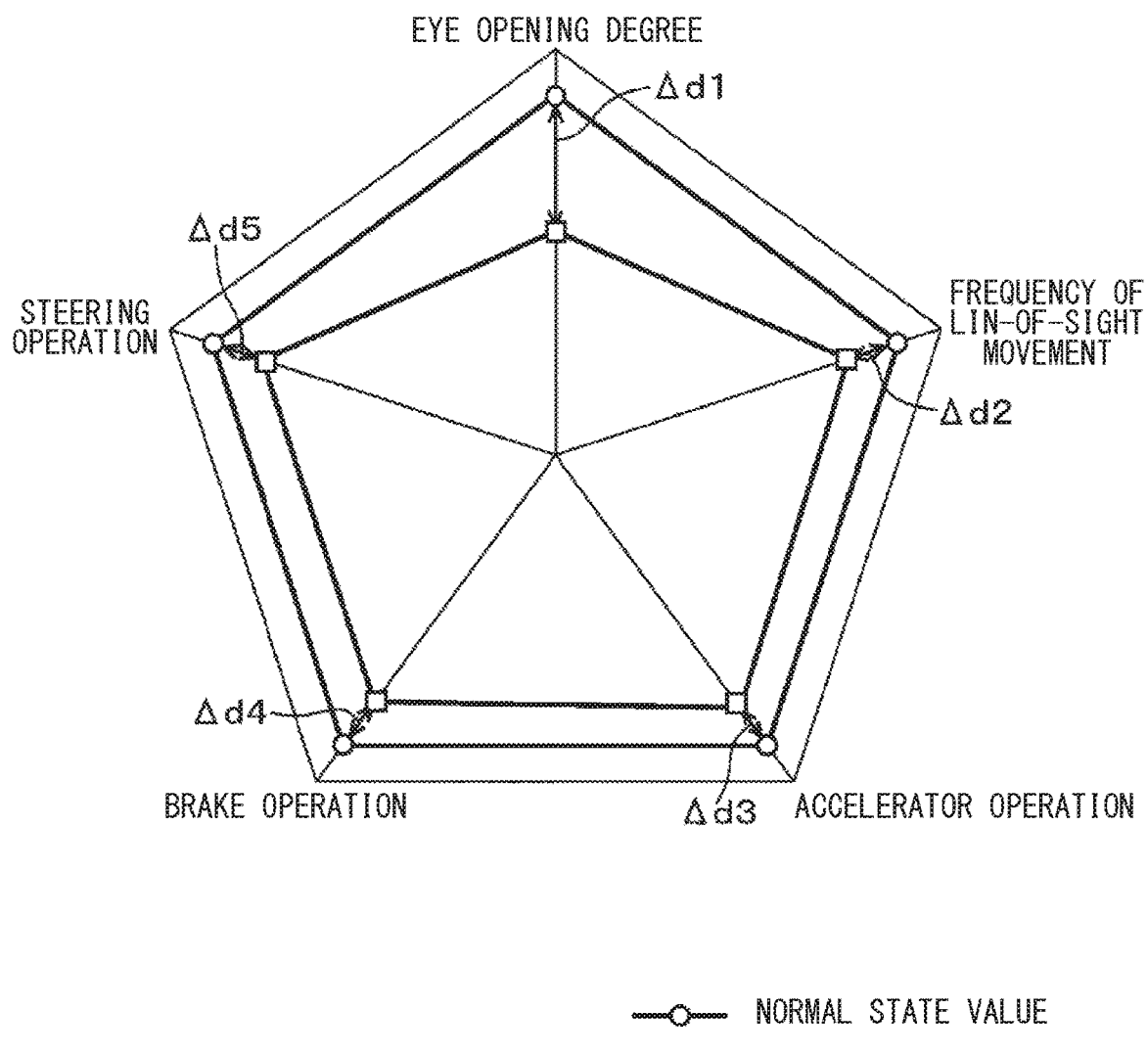
FIG. 4 is a diagram (part 2) showing the normal state values and the measurement values of the determination items.

The vehicle inside notification controller 19e compares the sum ($\Delta d1+\Delta d2+\Delta d3+\Delta d4+\Delta d5$) calculated by the deviation determiner 19d with a first determination value (A(sum)) set in advance. When a period in which the sum exceeds the first determination value continues for a predetermined period, the vehicle inside notification controller 19e outputs the notification instruction signal to the HMI instrument 5. The HMI instrument 5 performs the notification operation for notifying the driver of the possibility that the driving state of the driver of the subject vehicle deviates from the safe driving state. That is, as shown in FIG. 3, the deviation degree between the normal state value and the measurement value is high. When the period in which the sum calculated by the deviation determiner 19d exceeds the first determination value continues for the predetermined period, the vehicle inside notification controller 19e outputs the notification instruction signal to the HMI instrument 5, and the HMI instrument 5 notifies the driver of the possibility that the driving state of the driver of the subject vehicle deviates from the safe driving state. A condition for performing such a notification operation for the inside of the vehicle may not be limited to the case where the sum described above exceeds the first determination value. As shown in FIG. 4, for example, the sum does not exceed the first determination value. However, even when the deviation degree between any of the five determination items and the normal state value is significantly high and therefore the period in which the difference (for example, Δd1) between any of the measurement values and the normal state value exceeds any of the determination values (for example, A(1)) continues for the predetermined period, the vehicle inside notification controller 19e may perform the notification operation.

When the information reception determiner 19g determines that safe driving deviation information is received from the outside of the vehicle, the vehicle inside notification controller 19e causes the HMI instrument 5 to notify the driver of the possibility that a driving state of a driver of the other vehicle as the transmission source of the safe driving deviation information deviates from the safe driving state.

Figure 5:
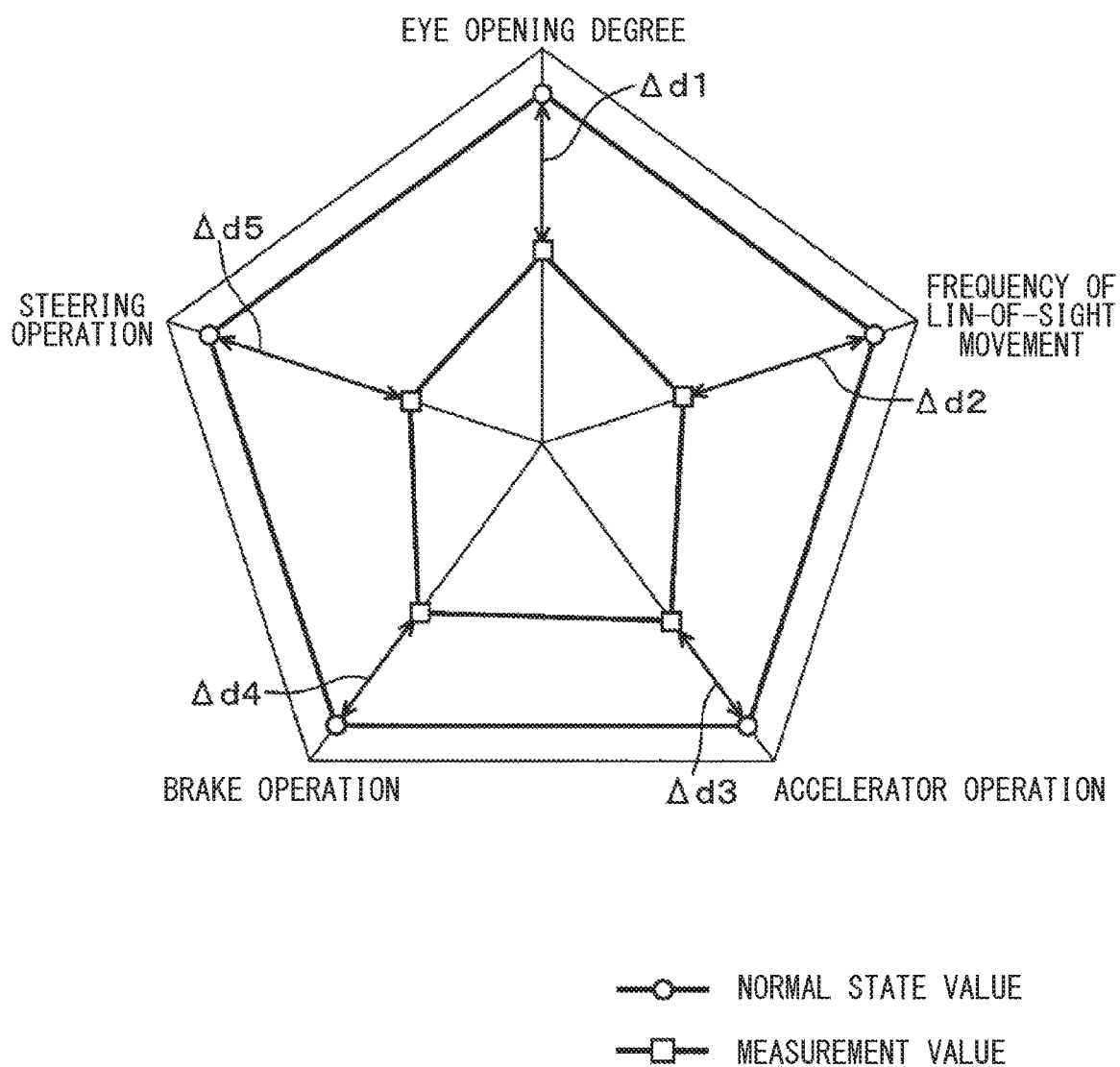
FIG. 5 is a diagram (part 3) showing the normal state values and the measurement values of the determination items.
Figure 6:
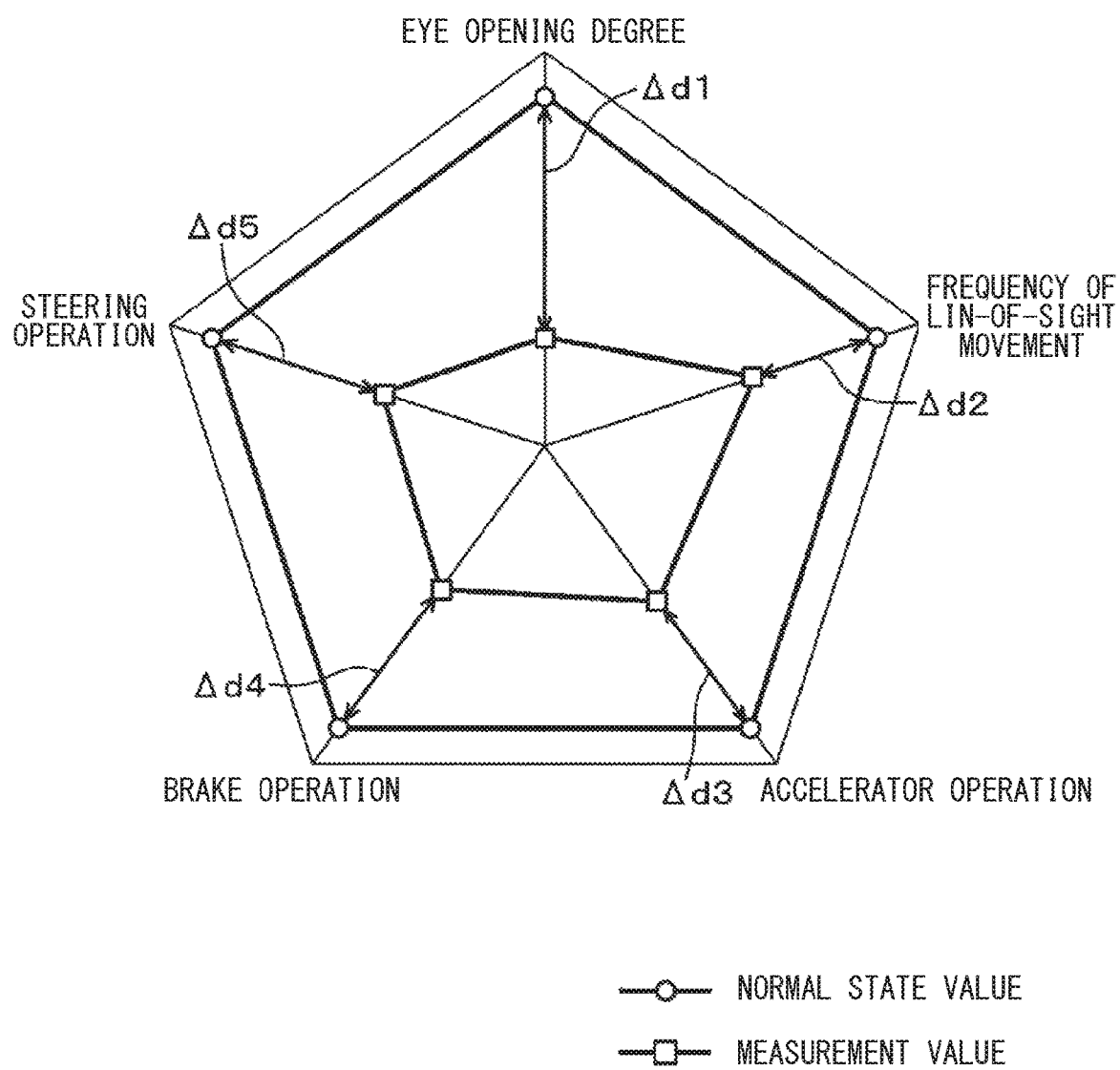
FIG. 6 is a diagram (part 4) showing the normal state values and the measurement values of the determination items.
Figure 7:
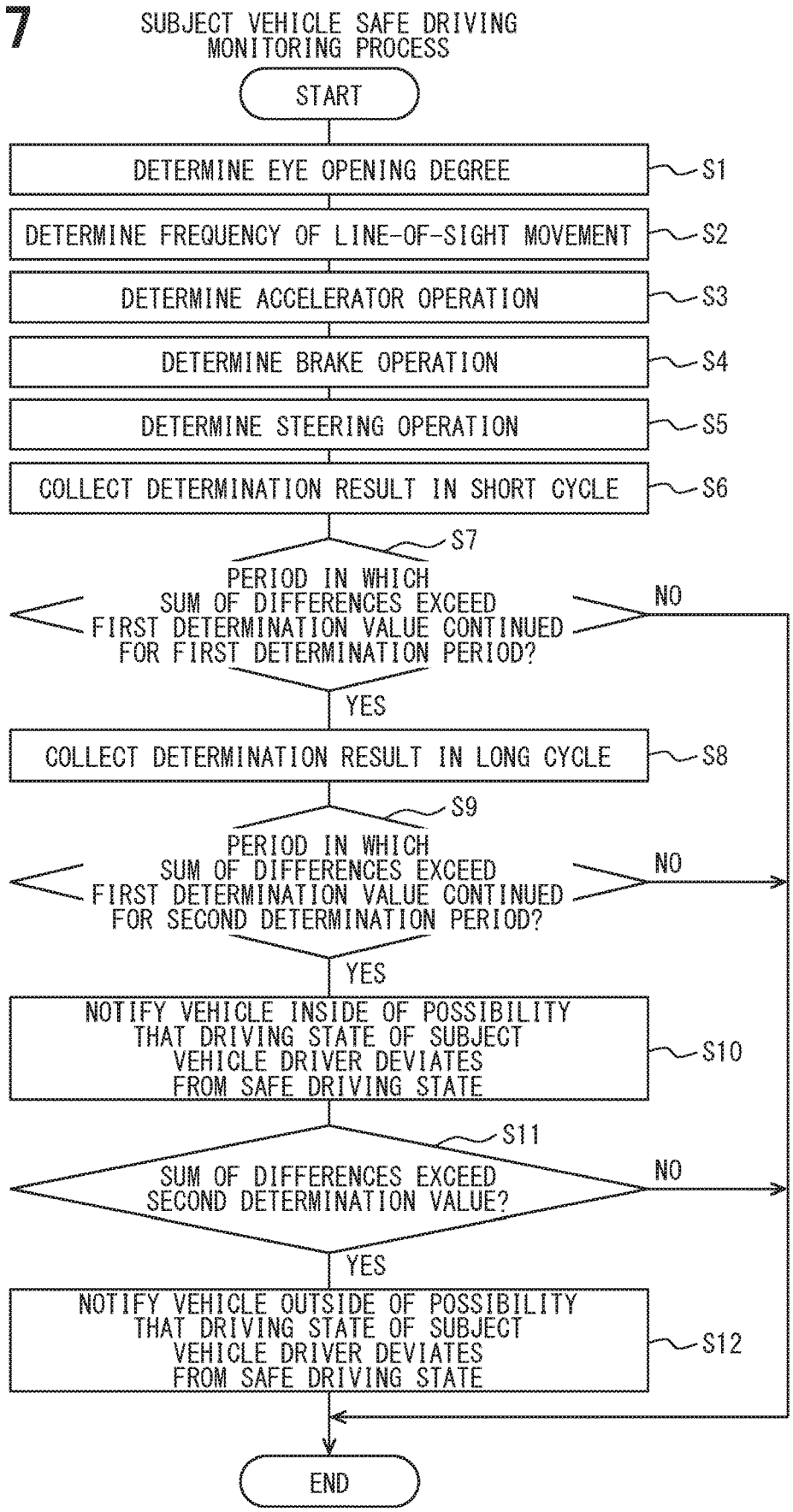
FIG. 7 is a flowchart showing a subject vehicle safe driving monitoring process.

The vehicle outside notification controller 19f compares the sum calculated by the deviation determiner 19d with a second determination value (B(sum)) set in advance higher than the first determination value. When a period in which the sum exceeds the second determination value continues for a predetermined period, the vehicle outside notification controller 19f outputs the transmission instruction signal to the communication instrument 6. The communication instrument 6 performs the notification operation for notifying the outside of the possibility that the driving state of the driver of the subject vehicle deviates from the safe driving state. That is, as shown in FIG. 5, the deviation degree between the normal state value and the measurement value is higher than that shown in FIG. 3. When the period in which the sum calculated by the deviation determiner 19d exceeds the second determination value continues for the predetermined period, the vehicle outside notification controller 19f outputs the transmission instruction signal to the communication instrument 6, and the communication instrument 6 notifies the outside of the possibility that the driving state of the driver of the subject vehicle deviates from the safe driving state. A condition for performing such notification operation for the outside of the vehicle may not be limited to the case where the sum described above exceeds the second determination value. As shown in FIG. 6, for example, the sum does not exceed the second determination value. However, even when the deviation degree between any of the five determination items and the normal state value is furthermore significantly high and therefore the period in which the difference (for example, Δd1) between any of the measurement values and the normal state value exceeds any of the determination values (for example, B(1)) continues for the predetermined period, the vehicle outside notification controller 19f may perform the notification operation.

The air conditioning controller 19h outputs the control signal to the air conditioning system 12 on a condition that the sum calculated by the deviation determiner 19d exceeds an air conditioning determination value set in advance. The air conditioning system 12 performs air conditioning control. The air conditioning determination value may be equal to, higher than, or lower than the first determination value and the second determination value described above. For example, when the air conditioning determination value is equal to the first determination value, the HMI instrument 5 performs the notification operation for the inside of the vehicle, and the air conditioning system 12 simultaneously performs the air conditioning control.

The safe traveling controller 19i outputs the control signal to the safe traveling system 13 on a condition that the sum calculated by the deviation determiner 19d exceeds a safe traveling determination value set in advance. The safe traveling system 13 performs safe traveling control. Similarly to the air conditioning determination value described above, the safe traveling determination value may be equal to, higher than, or smaller than the first determination value and the second determination value described above. For example, when the safe traveling determination value is equal to the second determination value, the communication instrument 6 performs the notification operation for the outside of the vehicle, and the safe traveling system 13 simultaneously performs the safe traveling control.

Next, behavior of the configuration described above will be described with reference to FIGS. 7 to 16.

In the vehicular device 2, the controller 19 executes a subject vehicle safe driving monitoring process and an other vehicle safe driving monitoring process in a predetermined cycle in a state where, for example, an ignition turns on. Hereinafter, each of the processes will be described. Here, it is assumed that the air conditioning determination value is set to be equal to the first determination value, and the safe traveling determination value is set to be equal to the second determination value.

(1) Subject Vehicle Safe Driving Monitoring Process

When a start event of the subject vehicle safe driving monitoring process is established, the controller 19 executes the subject vehicle safe driving monitoring process. The controller 19 determines the eye opening degree of the driver based on the image signal output from the vehicle inside capturing camera 3 to the vehicular device 2 (S1, an eye opening degree determination procedure), and determines the frequency of the line-of-sight movement of the driver (S2, a line-of-sight movement determination procedure). The controller 19 determines the accelerator operation of the driver based on the detection signal output from the accelerator ECU 8 to the vehicular device 2 (S3, an operation determination procedure), determines the brake operation of the driver based on the detection signal output from the brake ECU 9 to the vehicular device 2 (S4, the operation determination procedure), and determines the steering operation of the driver based on the detection signal output from the steering ECU 10 to the vehicular device 2 (S5, the operation determination procedure).

The controller 19 stores the determination result of these five determination items, and collects the determination result in a short cycle (S6). That is, the controller 19 comprehensively determines the determination result of the subject vehicle safe driving monitoring processes until the current timing from a timing traced back from the current timing by a first predetermined number of times. The controller 19 determines the possibility that the driving state of the driver of the subject vehicle deviates from the safe driving state based on the determination result in the short cycle. Specifically, for example, the controller 19 determines whether a period in which the sum obtained by summing each of the differences between the measurement value and the normal state value for each determination item exceeds the first determination value continues for the first determination period (S7, a deviation determination procedure).

When determining that the period in which the sum of the differences exceeds the first determination value continues for the first determination period (S7: NO), the controller 19 ends the subject vehicle safe driving monitoring process, and waits for the establishment of the start event of the next subject vehicle safe driving monitoring process. On the other hand, when determining that the period in which the sum of the differences exceeds the first determination value continues for the first determination period (S7: YES), the controller 19 collects the determination result in a long cycle (S8). That is, the controller 19 comprehensively determines the determination result of the subject vehicle safe driving monitoring processes until the current timing from a timing traced back from the current timing by a second predetermined number of times furthermore higher than the first predetermined number of times. The controller 19 determines the possibility that the driving state of the driver of the subject vehicle deviates from the safe driving state based on the determination result in the long cycle. Specifically, the controller 19 determines whether the period in which the sum of the differences exceeds the first determination value continues for a second determination period (corresponding to a predetermined period) furthermore longer than the first determination period (S9, a deviation determination procedure).

When determining that the period in which the sum of the differences exceeds the first determination value continues for the second determination period (S9: NO), the controller 19 ends the subject vehicle safe driving monitoring process, and waits for the establishment of the start event of the next subject vehicle safe driving monitoring process. On the other hand, when determining the period in which the sum of the differences exceeds the first determination value continues for the second determination period (S9: YES), the controller 19 outputs the notification instruction signal to the HMI instrument 5. The HMI instrument 5 performs the notification operation for notifying the inside of the vehicle of the possibility that the driving state of the driver of the subject vehicle deviates from the safe driving state (S10).

Figure 9:
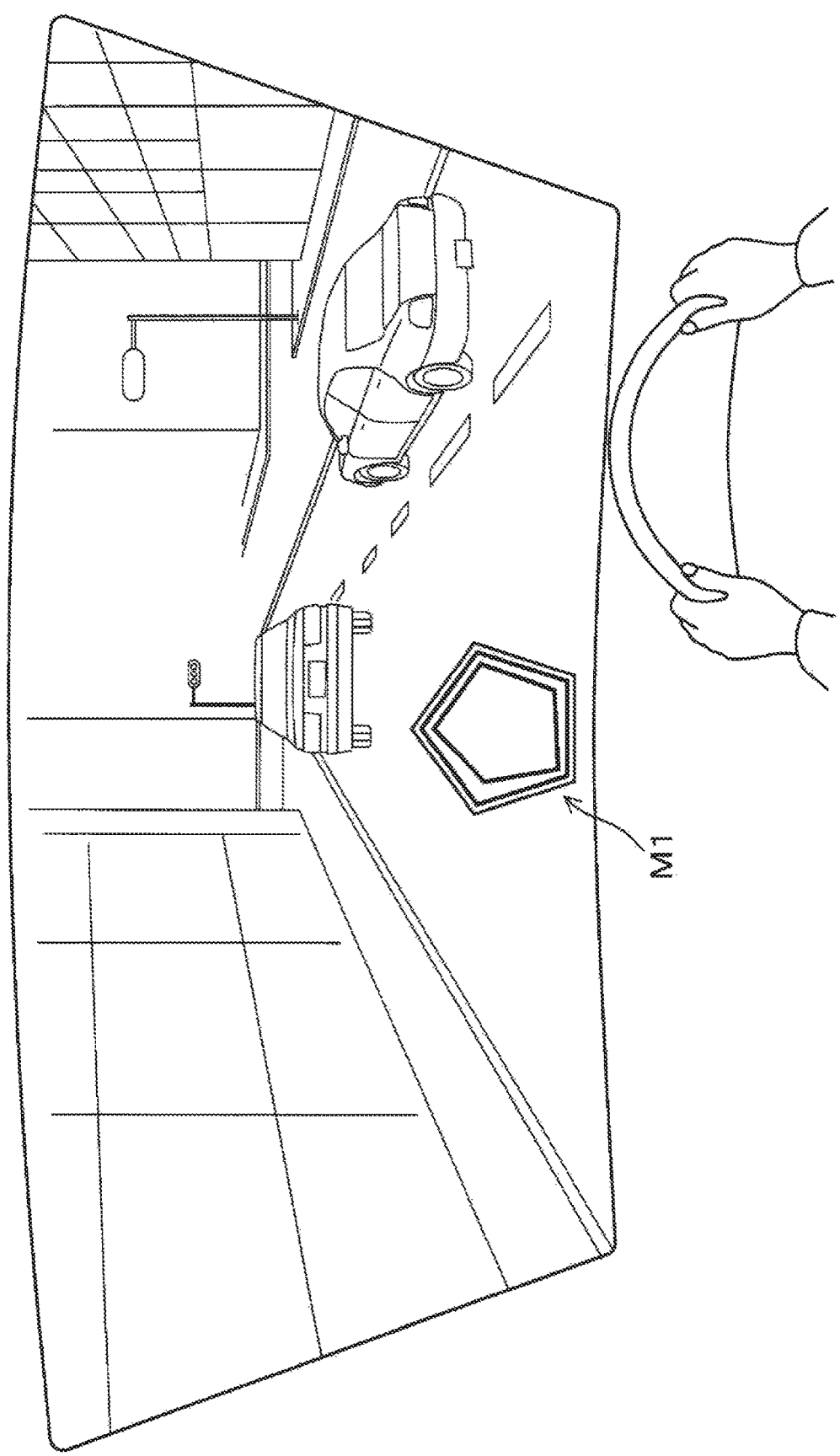
FIG. 9 is a diagram (part 1) showing a mode of displaying display information.

As shown in FIG. 9, a pentagonal graph M1 indicating the difference between the measurement value and the normal state value, the difference being obtained by calculation for each determination item, is displayed on the head up display with the display information by the controller 19. Thereby, the controller 19 notifies the driver of the deviation degree from the normal state of the current driving state of the subject vehicle to notify the driver of the possibility that the driving of the subject vehicle deviates from the safe driving state. The controller 19 displays the pentagonal graph M1 at a position that does not obstruct a forward view of the driver. The controller 19 may display, for example, the normal state value in blue and the measurement value in red or the like for classification. The controller 19 may change the color or the degree of shading in accordance with the deviation degree, and may intuitively notify the driver of the deviation degree. The controller 19 may not use the head up display for the notification, and may use a display unit or a speaker for the notification. Then, the controller 19 outputs the control signal to the air conditioning system 12 to cause the air conditioning system 12 to perform the air conditioning control. For example, the driver is stimulated by increasing the volume of air toward the driver or the like, and thereby the state causing the possibility of deviating from the safe driving state is resolved.

The controller 19 determines whether the sum of the differences exceeds the second determination value furthermore higher than the first determination value (S11). When determining the sum of the differences does not exceed the second determination value (S11: NO), the controller 19 ends the subject vehicle safe driving monitoring process, and waits for the establishment of the start event of the next subject vehicle safe driving monitoring process.

On the other hand, when determining that the sum of the differences exceeds the second determination value (S11: NO), the controller 19 outputs the transmission instruction signal to the communication instrument 6. The communication instrument 6 performs the notification operation for notifying the outside of the vehicle of the possibility that the driving state of the driver of the subject vehicle deviates from the safe driving state (S12). The controller 19 causes the server 17 or the communication instrument 18 of the other vehicle to transmit the transmission signal including the safe driving deviation information indicating the possibility that the driving state of the driver of the subject vehicle deviates from the safe driving state. Then, the controller 19 outputs the controller signal to the safe traveling system 13 to cause the safe traveling system 13 to perform the safe traveling control. Thereby, for example, an occurrence of a traffic accident is prevented by maintaining the inter vehicle distance between the subject vehicle and the preceding vehicle at the certain distance or the like. Thereafter, the controller 19 ends the subject vehicle safe driving monitoring process, and waits for the establishment of the start event of the next subject vehicle safe driving monitoring process.

Figure 10:
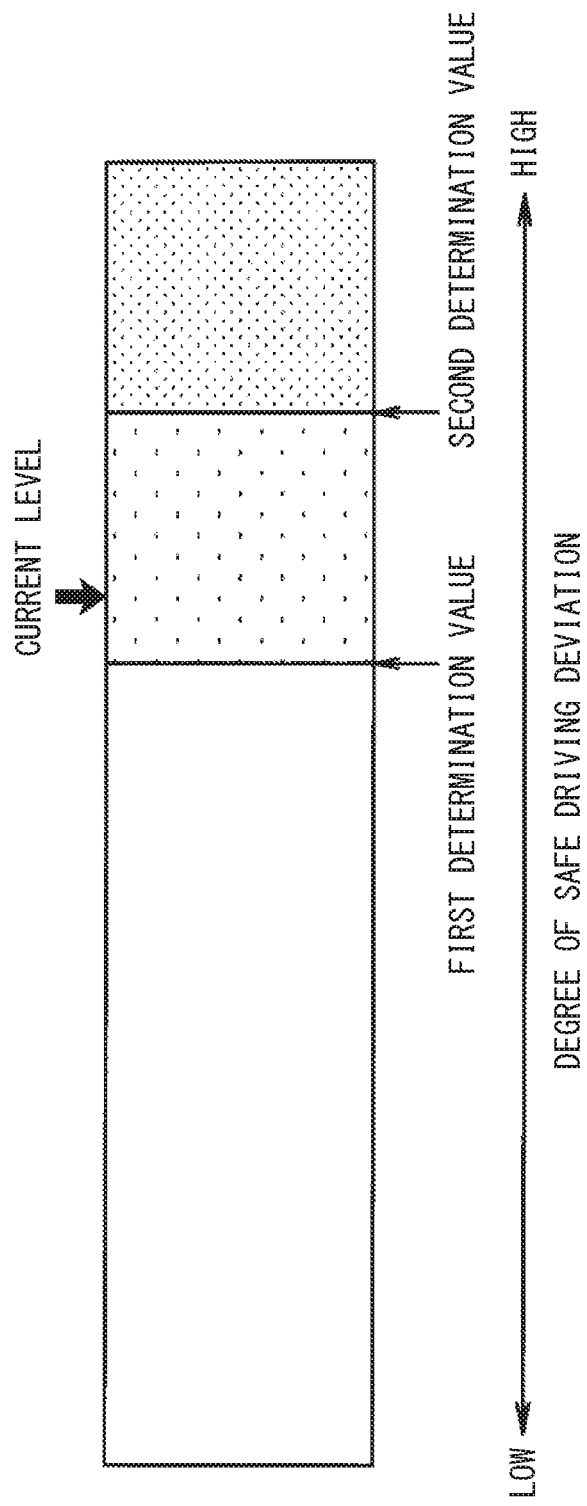
FIG. 10 is a diagram showing a relation among a current level, a first determination value, and a second determination value.
Figure 11:
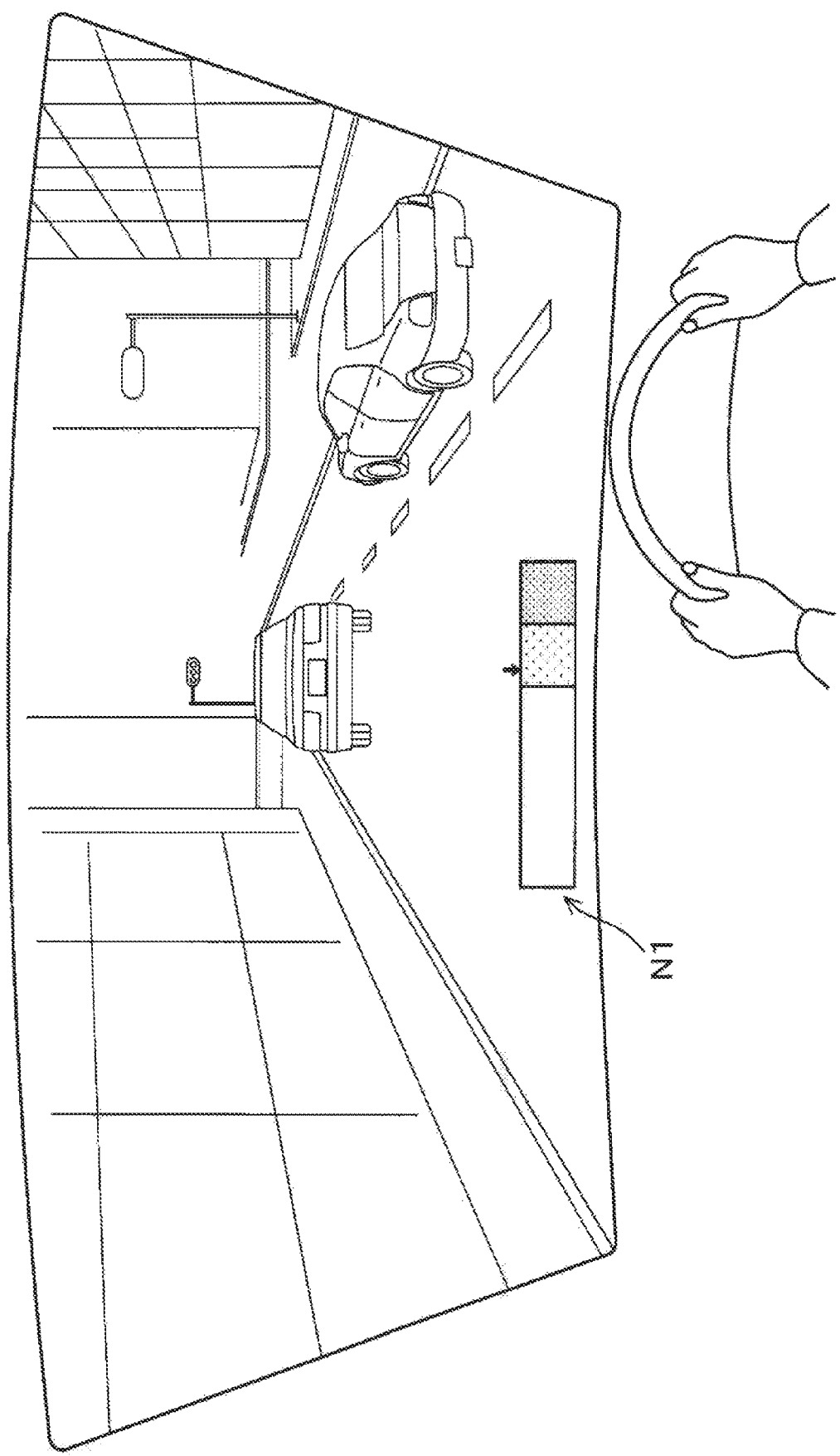
FIG. 11 is a diagram (part 2) showing a mode of displaying the display information.

Instead of displaying the pentagonal graph M1, as shown in FIG. 10, the controller 19 may sets the sum of the differences to the current level, and calculates the relation between the current level and each of the first determination value and the second determination value. As shown in FIG. 11, a bar shaped graph N1 indicating the relation between the calculated current level and each of the first determination value and the second determination value may be displayed. In this case, the controller 19 may change the color or the degree of shading in accordance with the deviation degree, and intuitively notify the driver of the deviation degree.

(2) Other Vehicle Safe Driving Monitoring Process

Figure 8:
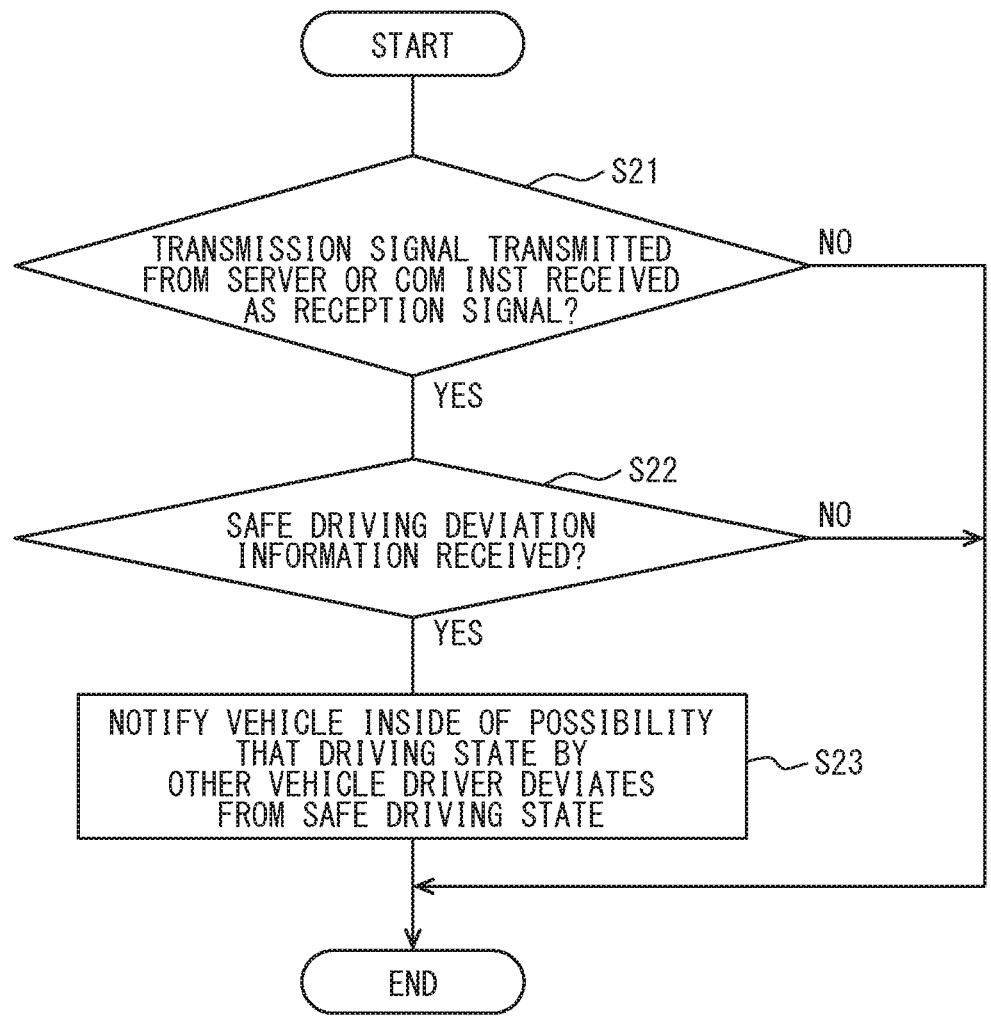
FIG. 8 is a flowchart showing an other vehicle safe driving monitoring process.

As shown in FIG. 8, when the start event of the other vehicle safe driving monitoring process is established, the controller 19 starts the other vehicle safe driving monitoring process. The controller 19 determines whether the communication instrument 6 receives, as the reception signal, the transmission signal transmitted from the server 17 or the communication instrument 18 of the other vehicle (S21). When determining that the communication instrument 6 receives, as the reception signal, the transmission signal (S21: YES), the controller 19 determines whether the reception signal includes the safe driving deviation information to determine whether the safe driving deviation information is received (S22).

When determining that the reception signal does not include the safe driving deviation information and determining that the safe driving deviation information is not received from the server 17 or the communication instrument 18 of the other vehicle (S22: NO), the controller 19 ends the other vehicle safe driving monitoring process and waits for the establishment of the start event of the next other vehicle safe driving monitoring process. On the other hand, when determining that the reception signal includes the safe driving deviation information and determining that the safe driving deviation information is received from the server 17 or the communication instrument 18 of the other vehicle (S22: YES), the controller 19 outputs the notification instruction signal to the HMI instrument 5. The HMI instrument 5 performs the notification operation for notifying the inside of the vehicle of the possibility that the driving state of the driver of the other vehicle deviates from the safe driving state (S23). The controller 19 ends the other vehicle safe driving monitoring process, and waits for the establishment of the start event of the next other vehicle safe driving monitoring process.

Figure 12:
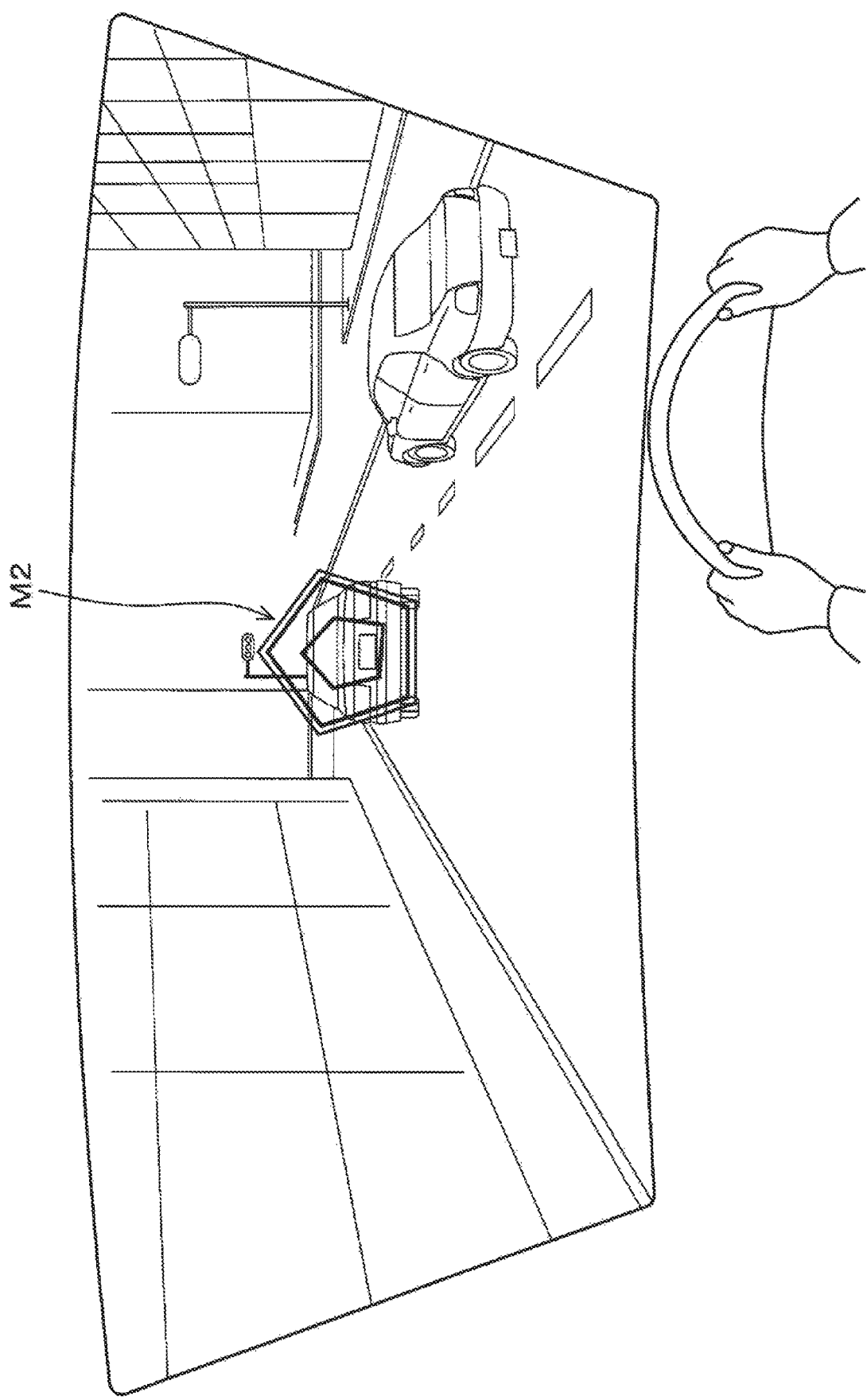
FIG. 12 is a diagram (part 3) showing a mode of displaying the display information.
Figure 13:
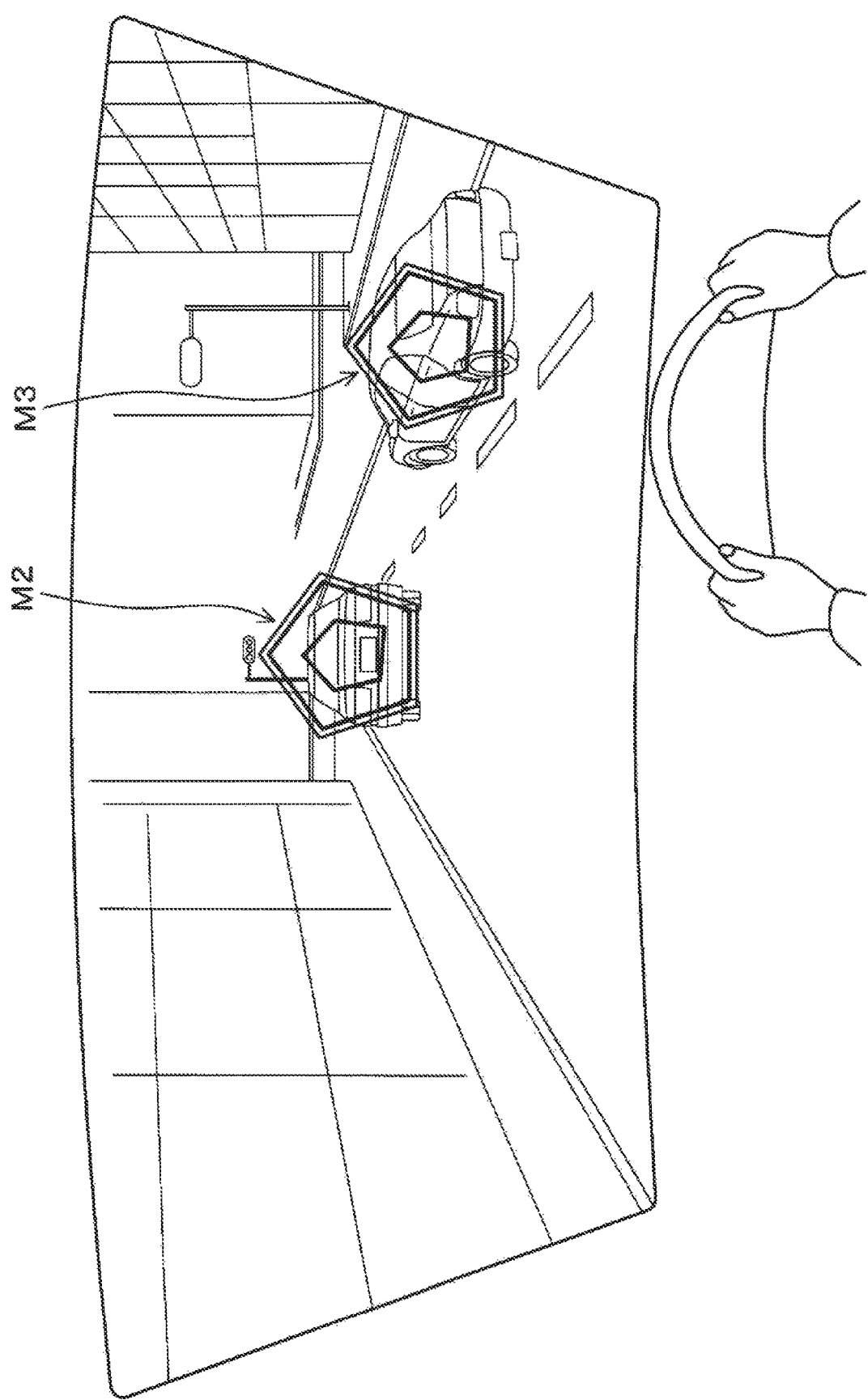
FIG. 13 is a diagram (part 4) showing a mode of displaying the display information.
Figure 14:
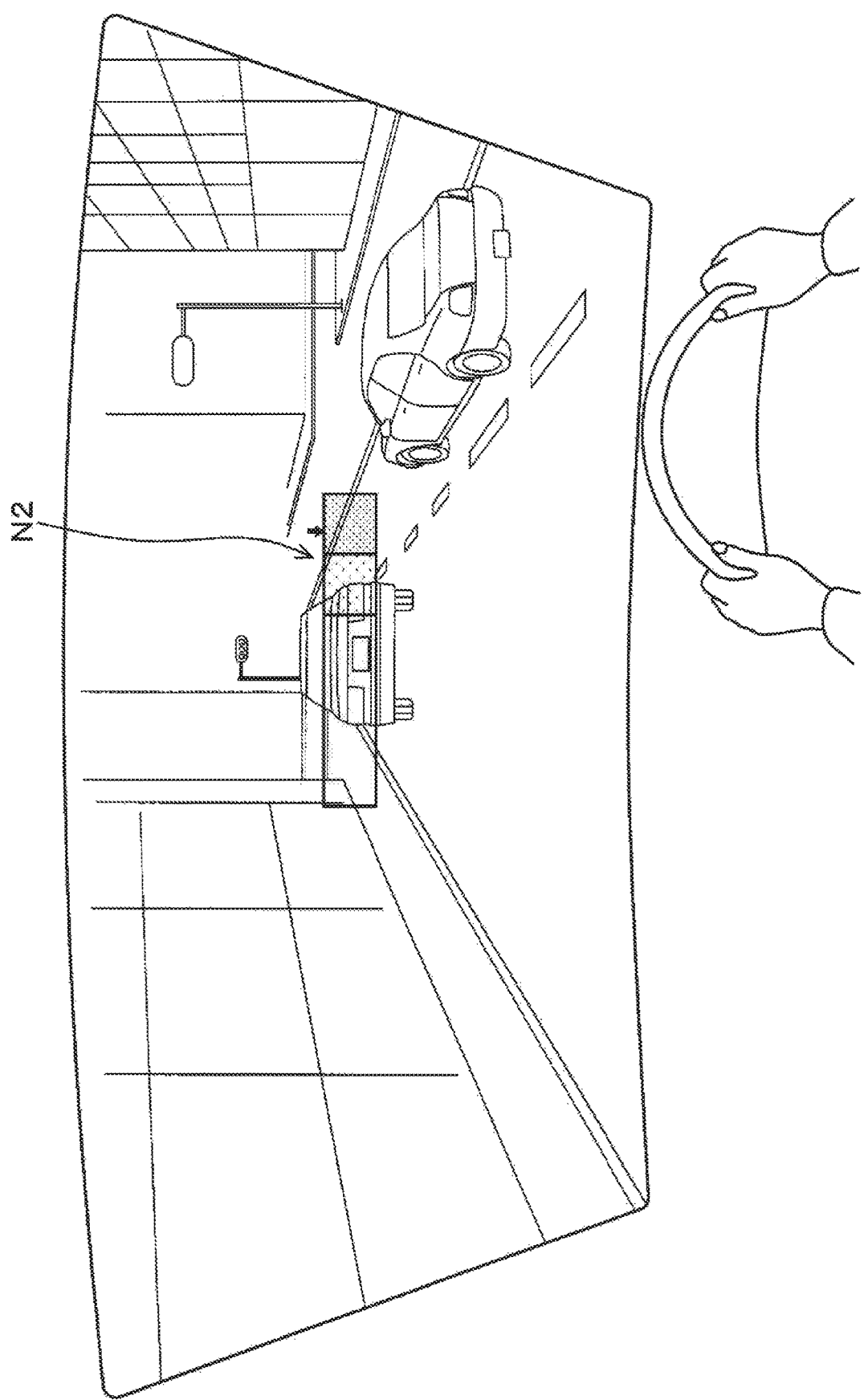
FIG. 14 is a diagram (part 5) showing a mode of displaying the display information.
Figure 15:
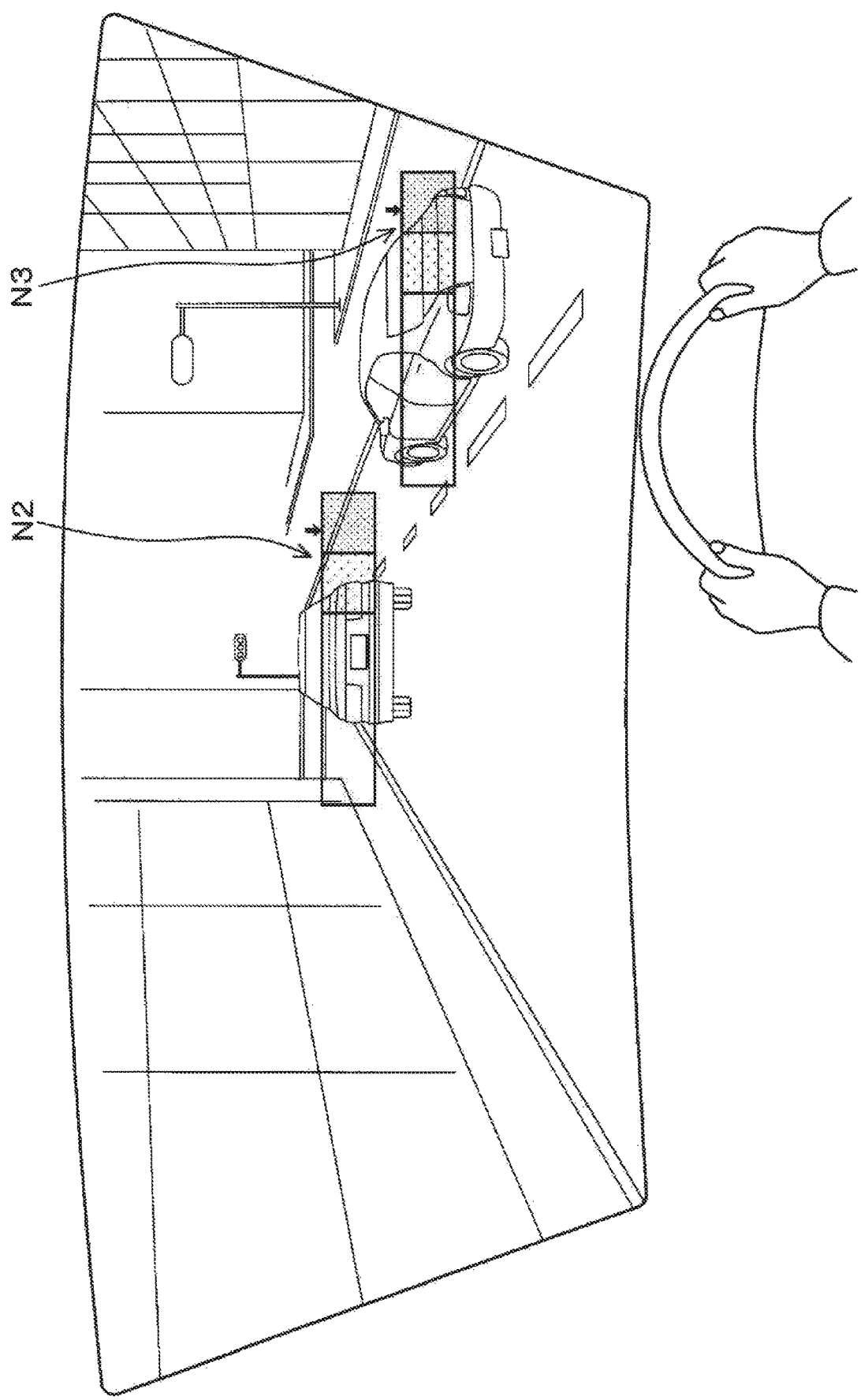
FIG. 15 is a diagram (part 6) showing a mode of displaying the display information.
Figure 16:
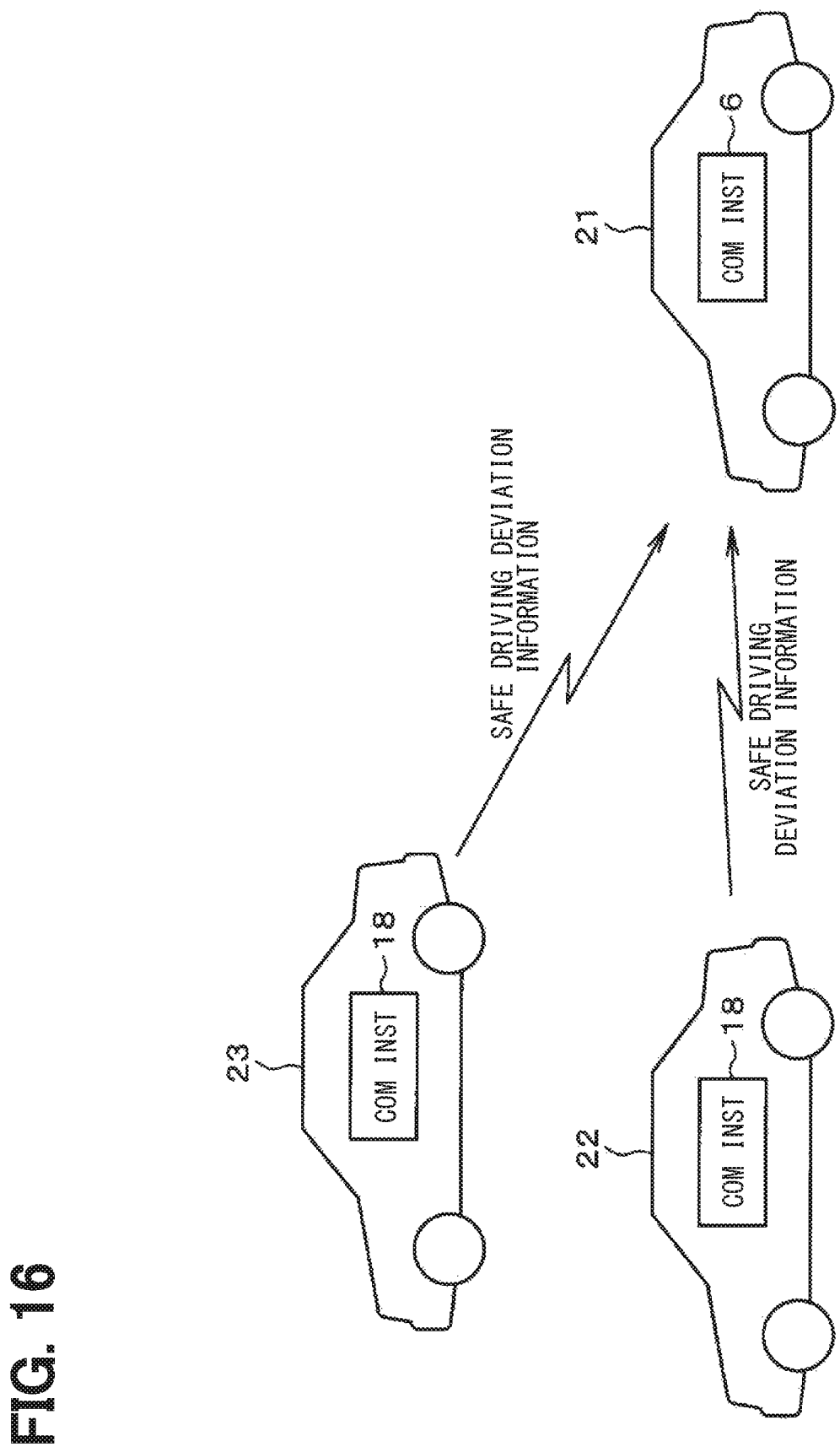
FIG. 16 is a diagram showing a mode of directly transmitting and receiving safe driving deviation information.

As shown in FIG. 12, a pentagonal graph M2 indicates the safe driving deviation information received from the server 17 or the communication instrument 18 of the other vehicle. By displaying, as the display information, the pentagonal graph M2 overlapping with the other vehicle as the transmission source of the safe driving deviation information on the head up display, the controller 19 notifies the driver of the deviation degree from the normal state of the current driving state of the other vehicle to notify the driver of the possibility that the driving of the other vehicle deviates from the safe driving state. When the multiple safe driving deviation information are simultaneously received from the server 17 or each communication instrument 18 of the multiple other vehicles, as shown in FIG. 13, the controller 19 may display, as the display information, each of the pentagonal graph M2 and a pentagonal graph M3 with overlapping with each of the other vehicles as the transmission source of the safe driving deviation information on the head up display. In this case, instead of displaying the pentagonal graphs M2 and M3, the controller 19 may display the bar shaped graph N2 and a bar shaped graph N3 as shown in FIG. 14 and FIG. 15.

Figure 17:
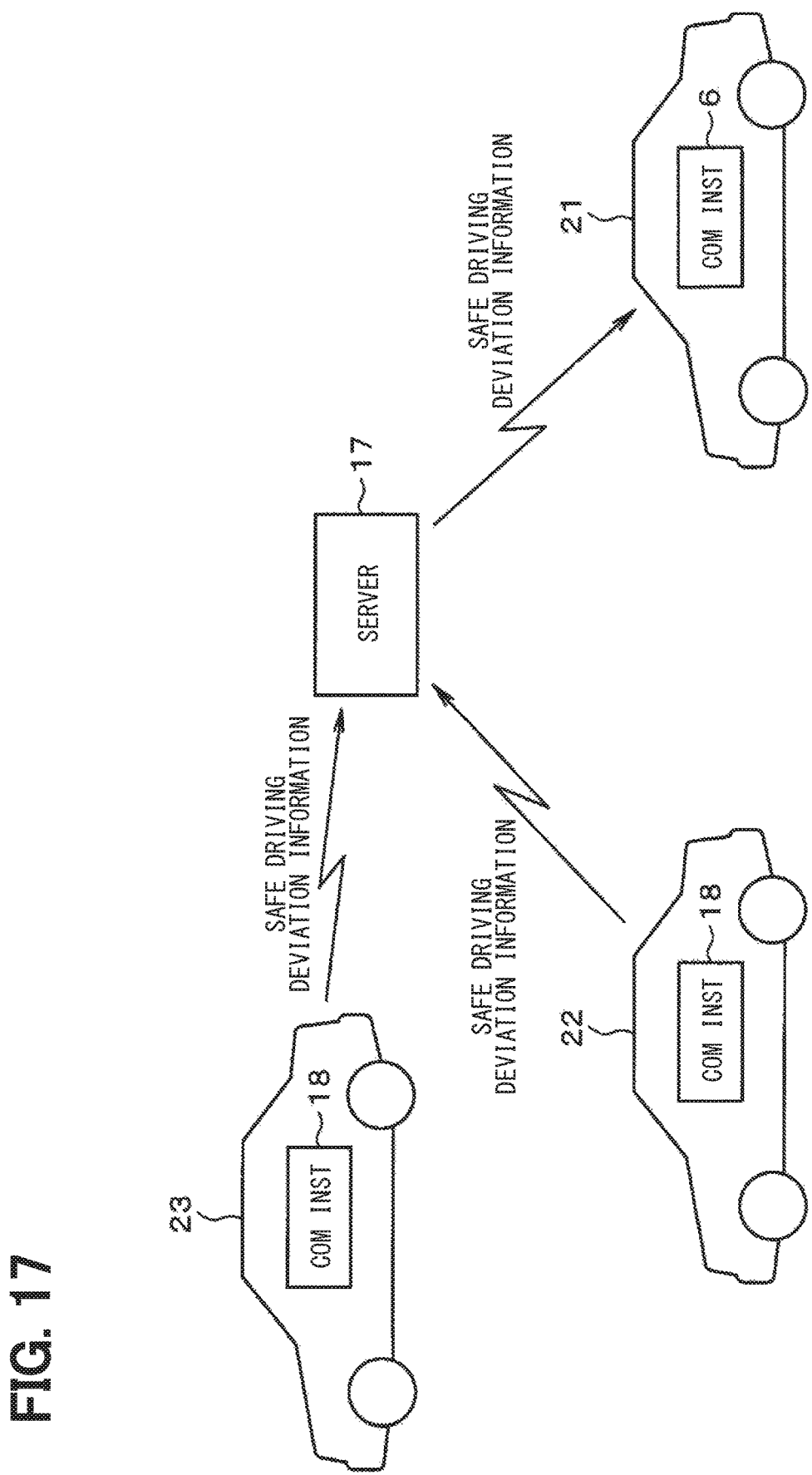
FIG. 17 is a diagram showing a mode of transmitting and receiving the safe driving deviation information via a server.

As described above, as shown in FIG. 16, the inter vehicle communication between the communication instrument 6 of the subject vehicle 21 and each communication instrument 18 of the other vehicles 22 and 23 is performed, and the safe driving deviation information is directly transmitted and received. Thereby, it may be possible to share the possibility of the deviation from the safe driving among the subject vehicle 21 and the other vehicles 22 and 23. It may be possible to mutually ensure the safe driving state among the subject vehicle 21 and the other vehicles 22 and 23. As shown in FIG. 17, the communication between the communication instrument 6 of the subject vehicle 21 and each communication instrument 18 of the other vehicles 22 and 23 is performed via the server 17, and the safe driving deviation information is transmitted and received via the server 17. Thereby, it may be possible to share the possibility of the deviation from the safe driving state among the subject vehicle 21 and the other vehicles 22 and 23. It may be possible to mutually ensure the safe driving state among the subject vehicle 21 and the other vehicles 22 and 23.

The embodiment described above may provide effects as below.

In the vehicular device 2, the possibility that the driving state of the driver of the subject vehicle deviates from the safe driving state is determined based on the operation state of the driver for the accelerator pedal 14, the brake pedal 15, or the steering 16, in addition to the driver eye opening degree or the frequency of the line-of-sight movement. By adding the state of the accelerator operation, the brake operation, or the steering operation, it may be possible to multilaterally determine the possibility that the driving state of the driver of the subject vehicle deviates from the safe driving state. It may be possible to improve the determination accuracy of the possibility that the driving state of the driver of the subject vehicle deviates from the safe driving state.

The state of the accelerator operation, the brake operation, or the steering operation is determined by comparing the measurement value obtained by measuring the reaction speed or the operation amount of the accelerator operation, the brake operation, or the steering operation with the normal state value in the normal state of the driver. It may be possible to determine the state of the accelerator operation, the brake operation, or the steering operation by the simple method of comparing the measurement value with the normal state value.

Also, the normal state value is learned. For example, it may be possible to appropriately determine the state of the accelerator operation, the brake operation, or the steering operation by reflecting on the normal state value, the change of the reaction speed or the operation amount in accordance with the change of a body of the driver. It may be possible to appropriately improve the determination accuracy of the possibility that the driving state of the driver of the subject vehicle deviates from the safe driving state.

Also, the possibility that the driving state of the driver of the subject vehicle deviates from the safe driving state is determined based on the determination results in the two determination periods of the short cycle and the long cycle. It may be possible to appropriately improve the determination accuracy of the possibility that the driving state of the driver of the subject vehicle deviates from the safe driving state.

Also, on the condition that the possibility that the driving state of the driver of the subject vehicle deviates from the safe driving state exceeds the first determination value, the notification operation for notifying the inside of the vehicle that the possibility exceeds the first determination value is performed. On the condition the possibility that the driving state of the driver of the subject vehicle deviates from the safe driving state exceeds the second determination value higher than the first determination value, the notification operation for notifying the outside of the vehicle that the possibility exceeds the second determination value is performed. The notification operation for the inside of the vehicle and the notification operation for the outside of the vehicle are performed in stages. Thereby, when the possibility that the driving state of the driver of the subject vehicle deviates from the safe driving state is resolved by the notification operation for the inside of the vehicle, the notification operation for the outside of the vehicle is unnecessary. Therefore, it may be possible to avoid the situation where the unnecessary notification operation for the outside of the vehicle is performed.

Also, when the safe driving deviation information is received from the server 17 or the communication instrument 18 of the other vehicle, the notification operation for notifying the inside of the vehicle of the possibility that the driving state of the driver of the other vehicle deviates from the safe driving state is performed. It may be possible to notify the driver of the subject vehicle of the possibility that the driving state of the driver of the other vehicle deviates from the safe driving state. It may be possible to share the possibility that the driving state of the driver of the subject vehicle or the other vehicle deviates from the safe driving state between the driver of the subject vehicle and the driver of the other vehicle. It may be possible to mutually ensure the safe driving state between the subject vehicle and the other vehicle.

The air conditioning system 12 performs the air conditioning control on the condition that the possibility that the driving state of the driver of the subject vehicle deviates from the safe driving state exceeds the air conditioning determination value. It may be possible to resolve the state where there is the possibility of deviating from the safe driving state by cooperating with the air conditioning system 12.

The safe traveling system 13 performs the safe traveling control on the condition that the possibility that the driving state of the driver of the subject vehicle deviates from the safe driving state exceeds the safe traveling determination value. It may be possible to avoid the occurrence of the traffic accident by cooperating with the safe traveling system 13.

Although the present disclosure has been described in accordance with the embodiments, it is understood that the present disclosure is not limited to the embodiments and structures. The present disclosure may cover various modification examples and equivalent arrangements. Furthermore, various combinations and formations, and other combinations and formations including one, more than one or less than one element may be included in the scope and the spirit of the present disclosure.

The display information indicating the safe driving deviation information is not limited to the pentagonal graph or the bar shaped graph. Other modes may be employed.

In cooperation with a configuration of determining biological information regarding a body temperature, a heart rate, a brain waves, or the like of the driver, the possibility that the driving state of the driver of the subject vehicle deviates from the safe driving state may be determined additionally based on a determination result of the biological information.

The configuration is not limited to the configuration where the pentagonal graph or the bar shaped graph is automatically displayed when the safe driving deviation information is received from the server 17 or the communication instrument 18 of the other vehicle. The pentagonal graph or the bar shaped graph may be displayed on a condition including the operation by the driver. That is, in a case where the safe driving deviation information of the other vehicle is received, while the notification indicating the reception of the safe driving deviation information may be performed by, for example, an icon or the like, the driver may be inquired whether the notification by the graph is possible. On a condition that the driver performs the predetermined operation, the pentagonal graph or the graph may be displayed.

The content of the air conditioning control performed by the air conditioning system 12 when the possibility that the driving state of the driver of the subject vehicle deviates from the safe driving state exceeds the air conditioning determination value may be arbitrarily settable in advance by the driver, or may be automatically selected in accordance with the situation at the time. Similarly, the content of the safe traveling control performed by the safe traveling system 13 when the possibility that the driving state of the driver of the subject vehicle deviates from the safe driving state exceeds the safe traveling determination value may be arbitrarily settable in advance by the driver, or may be automatically selected in accordance with the situation at the time.

The configuration is not limited to the configuration of performing the notification operation for the inside of the vehicle and the notification operation for the outside of the vehicle in stages, and may be a configuration of simultaneously performing the notification operation for the inside of the vehicle and the notification operation for the outside of the vehicle. The notification operation for the inside of the vehicle may be any operation of resolving the sate including the possibility of deviating from the safe driving state. For example, the notification operation is not limited to the air conditioning control such as the control of increasing the volume of air toward the driver. A control of increasing the volume of the audio, providing stimulus from the sheet, or the like may be employed.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular device comprising:
an eye opening degree determiner configured to determine a driver eye opening degree;
a line-of-sight movement determiner configured to determine frequency of a driver line-of-sight movement;
an operation determiner configured to determine a driver operation state for a driving operation instrument;
a deviation determiner configured to determine a possibility that a driving state of a subject vehicle driver deviates from a safe driving state in a short cycle determination period and a long cycle determination period based on a determination result of the driver eye opening degree, a determination result of the frequency of the driver line-of-sight movement, a determination result of the driver operation state for the driving operation instrument;
a vehicle inside notification controller configured to perform a notification operation for a vehicle inside; and
a vehicle outside notification controller configured to perform a notification operation for a vehicle outside, wherein
on a condition that a value indicating the possibility that the driving state of the subject vehicle driver deviates from the safe driving state exceeds a first determination value for the short cycle determination period and on a condition that a value indicating the possibility that the driving state of the subject vehicle driver deviates from the safe driving state exceeds the first determination value for the long cycle determination period, the vehicle inside notification controller is configured to perform the notification operation for notifying the vehicle inside that the value exceeds the first determination value, and on a condition that the value indicating the possibility that the driving state of the subject vehicle driver deviates from the safe driving state exceeds a second determination value higher than the first determination value for the long cycle determination period, the vehicle outside notification controller is configured to perform the notification operation for notifying the vehicle outside that the value exceeds the second determination value.

2. The vehicular device according to claim 1, further comprising:
an information reception determiner configured to determine whether to receive safe driving deviation information from the vehicle outside,
wherein
the vehicle inside notification controller is configured to perform a notification operation for notifying the vehicle inside of a possibility that a driving state of an other vehicle driver deviates from the safe driving state on a condition of receiving the safe driving deviation information from the vehicle outside.

3. The vehicular device according to claim 1, wherein the operation determiner is configured to determine the driver operation state for the driving operation instrument based on at least one of a driver reaction speed for the driving operation instrument or a driver operation amount for the driving operation instrument.

4. The vehicular device according to claim 3, wherein the operation determiner is configured to determine the driver operation state for the driving operation instrument by comparing a measurement value obtained by measuring at least one of the driver reaction speed for the driving operation instrument or the driver operation amount for the driving operation instrument with a normal state value in a driver normal state.

5. The vehicular device according to claim 4, wherein the operation determiner is configured to learn the normal state value.

6. The vehicular device according to claim 1, further comprising:
an air conditioning controller configured to perform an air conditioning control by an air conditioning system,
wherein
the air conditioning controller is configured to perform the air conditioning control on a condition that the possibility that the driving state of the subject vehicle driver deviates from the safe driving state exceeds an air conditioning determination value.

7. The vehicular device according to claim 1, further comprising:
a safe traveling controller configured to perform a safe traveling control by a safe traveling system,
wherein
the safe traveling controller is configured to perform the safe traveling control on a condition that the possibility that the driving state of the subject vehicle driver deviates from the safe driving state exceeds a safe traveling determination value.

8. A computer-readable non-transitory storage medium storing a computer program configured to cause a controller of a vehicular device to
determine a driver eye opening degree,
determine frequency of a driver line-of-sight movement,
determine a driver operation state for a driving operation instrument,
determine a possibility that a driving state of a subject vehicle driver deviates from a safe driving state in a short cycle determination period and a long cycle determination period based on a determination result of the driver eye opening degree, a determination result of the frequency of the driver line-of-sight movement, and a determination result of the driver operation state for the driving operation instrument,
perform, on a condition that a value indicating the possibility that the driving state of the subject vehicle driver deviates from the safe driving state exceeds a first determination value for the short cycle determination period and on a condition that a value indicating the possibility that the driving state of the subject vehicle driver deviates from the safe driving state exceeds the first determination value for the long cycle determination period, a notification operation for notifying a vehicle inside that the value exceeds the first determination value, and
perform, on a condition that the value indicating the possibility that the driving state of the subject vehicle driver deviates from the safe driving state exceeds a second determination value higher than the first determination value for the long cycle determination period, a notification operation for notifying a vehicle outside that the value exceeds the second determination value.

* * * * *